(12) United States Patent  
Ludwig

(10) Patent No.: US 8,734,736 B2  
(45) Date of Patent: May 27, 2014

(54) VALVE-MANIFOLD LABORATORY GLASSWARE FOR CHEMICAL LABORATORY AUTOMATION AND OTHER APPLICATION

(75) Inventor: Lester F. Ludwig, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 14 days.

(21) Appl. No.: 12/899,531

(22) Filed: Oct. 6, 2010

(65) Prior Publication Data  
US 2011/0081281 A1 Apr. 7, 2011

Related U.S. Application Data

(60) Provisional application No. 61/249,251, filed on Oct. 6, 2009.

(51) Int. Cl.  
*B01L 99/00* (2010.01)

(52) U.S. Cl.  
USPC ........... 422/544; 422/935; 422/500; 251/304; 251/309; 251/310; 137/247; 137/563; 156/153; 392/399

(58) Field of Classification Search  
USPC ............. 422/935, 101, 100, 63, 199, 81, 500; 251/315.04, 304, 309–310; 137/247, 137/563, 583; 156/153; 392/399  
See application file for complete search history.

(56) References Cited

U.S. PATENT DOCUMENTS

| | | | | |
|---|---|---|---|---|
| 3,108,614 A | * | 10/1963 | Navara | 137/625.16 |
| 3,234,779 A | * | 2/1966 | Dawson, Jr. | 73/23.39 |
| 4,006,062 A | * | 2/1977 | Bhuchar et al. | 202/169 |
| 5,316,728 A | * | 5/1994 | Hayashi et al. | 422/70 |
| 6,257,271 B1 | * | 7/2001 | Babin et al. | 137/315.17 |
| 7,899,309 B2 | * | 3/2011 | Whyatt et al. | 392/399 |

* cited by examiner

*Primary Examiner* — Jyoti Nagpaul  
(74) *Attorney, Agent, or Firm* — Procopio, Cory, Hargreaves & Savitch LLP

(57) ABSTRACT

An article of laboratory glassware for directing the flow of chemical materials is described. The article includes a glass manifold having a plurality of input ports and at least one output port, and a plurality of stopcocks. Each stopcock has an inlet port and an outlet port connected by a passageway through the plug. Each of the stopcock output ports is connected to one of the manifold input ports, and each of the stopcock input ports is connected with one end of a hollow glass tube, and the other end of the hollow glass tube is connected to a female ground glass joint. The output ports of the manifold are terminated to a male ground glass joint. Each plug is rotated by an electrical motor or a servo, and sensed by a sensor. The rotation of each rotating plug is controlled by a computer.

20 Claims, 22 Drawing Sheets

VIEW THROUGH VALVE BODY APERTURE OPENING TO PLUG
(looking through valve tubing)

VIEW THROUGH VALVE BODY APERTURE OPENING TO PLUG
(looking through valve tubing)

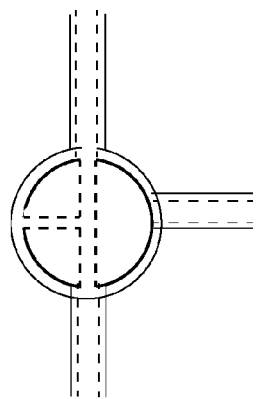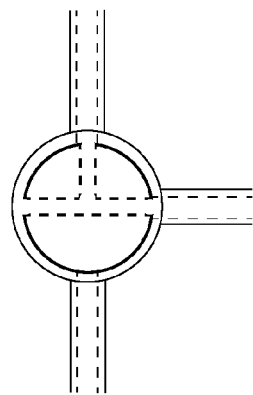
Figure 5a                                                Figure 5b
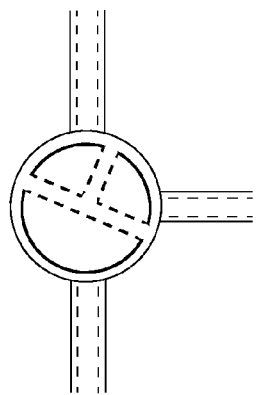
Figure 5e
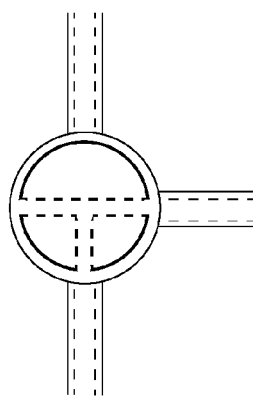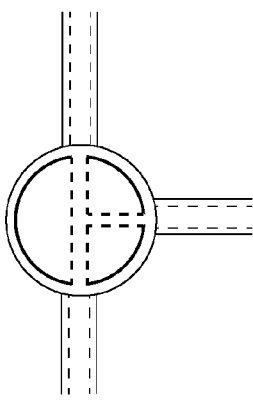
Figure 5c                                                Figure 5d

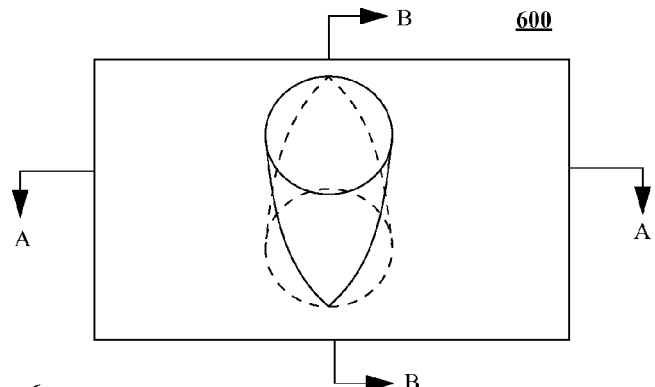
Figure 6g
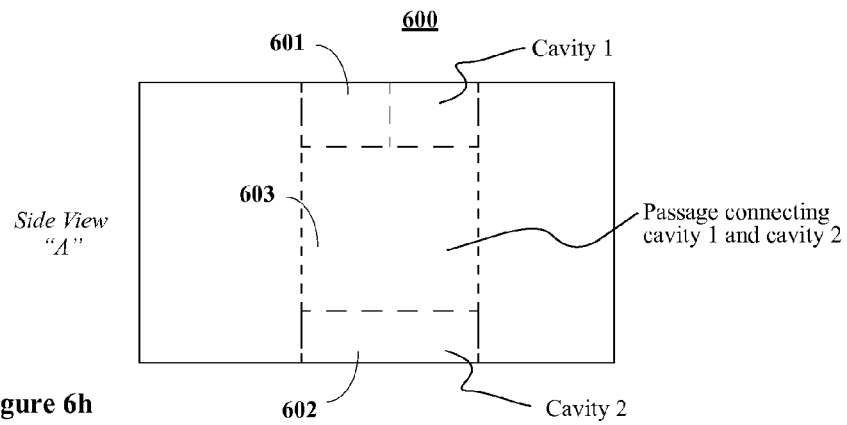
Figure 6h
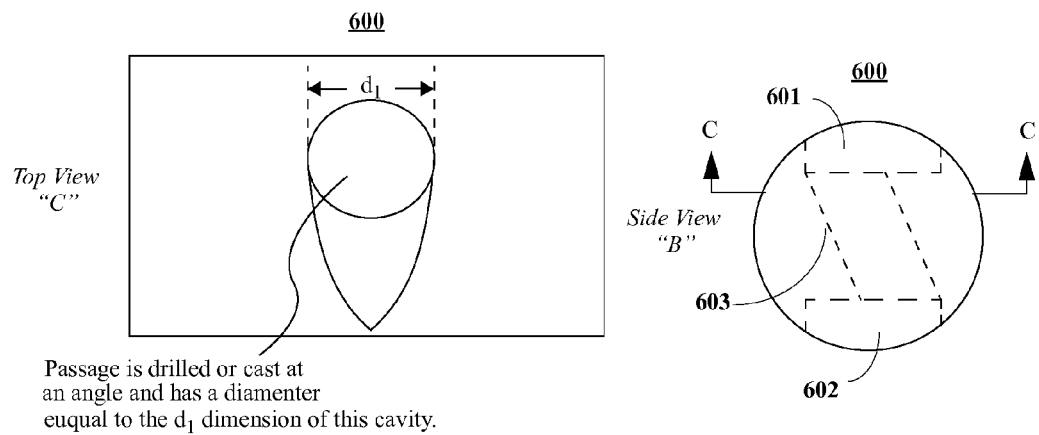
Figure 6i
Figure 6j

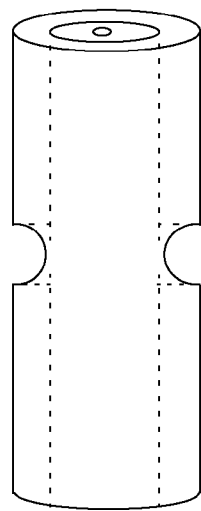
Figure 7a
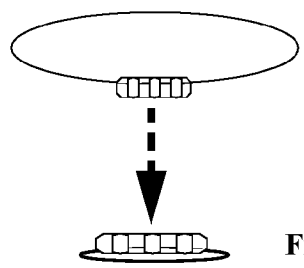
Figure 7f
Figure 7e
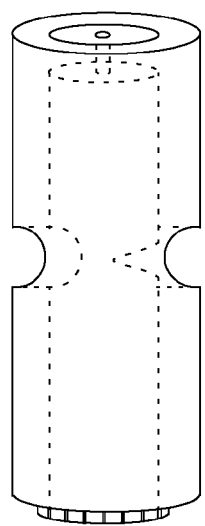
Figure 7c
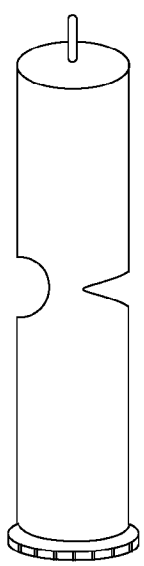
Figure 7b
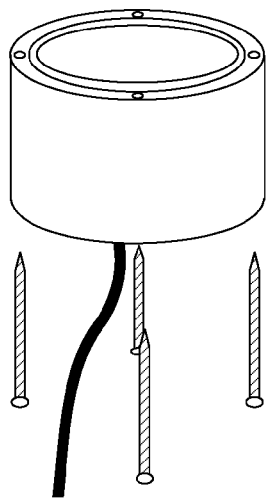
Figure 7d

VALVE-MANIFOLD LABORATORY GLASSWARE FOR CHEMICAL LABORATORY AUTOMATION AND OTHER APPLICATION

CROSS-REFERENCE TO RELATED APPLICATIONS

This application claims benefit of priority of U.S. provisional application Ser. No. 61/249,251 filed on Oct. 6, 2009, incorporated herein by reference.

BACKGROUND OF THE INVENTION

1. Field of the Invention

The invention pertains to chemical processing, chemical process design, chemical process modeling, and laboratory apparatus, and in more detail to modular laboratory apparatus and associated components and associated computer systems and numerical models used in the study and design of reactive separation systems, and in particular as applied to reactive distillation.

2. Background of the Invention

Many chemical laboratory setups and production systems involving extensive investments of expensive and established laboratory glassware, both general purpose and special purpose, are run by scientists and other highly-trained laboratory technicians. Existing methods typically employed to operate these chemical laboratory setups and production systems can be time-consuming, expensive, tedious, and often comprise difficult to precisely record and precisely replicate actions involved in operation of these chemical laboratory setups and production systems. Automating these tasks could save both time and money as well as increase precision and reproducibility.

In order to automate such tasks glassware-based systems would beneficially be adapted to be able to connect with various combinations of servos, motors, electrical apparatus (heaters, pumps, chillers, aerators, etc.) control, and sensors. Ideally such adaptations would make it so traditional laboratory glassware-based systems can be controlled by computers providing user interface software, even recording, and process control software, as well as permitting operation by hand.

The present invention addresses these matters. The invention provides:

- Servo-controlled adaptors for traditional laboratory glassware apparatus stopcocks;
- Elongating the passageway opening along the surface and through the stopcock plug to increase the usable rotation angle so as to provide the user or a servo system get finer degrees of accuracy in adjustment;
- Multiple-port glassware arrangements involving one or more stopcocks.

SUMMARY OF THE INVENTION

The invention relates to an article of laboratory glassware for directing the flow of chemical materials. The article comprises a glass manifold having a plurality of input ports and at least one output port, and a plurality of stopcocks.

Each stopcock has an inlet port and an outlet port for carrying the flow of chemical materials, each stopcock further having a rotating plug with a passageway through the diameter of the plug for connecting the inlet port with the outlet port of each stopcock. Each of the stopcock output ports is connected to one of the manifold input ports, and each of the stopcock input ports is connected with one end of one of a plurality of hollow glass tubes, and wherein the other end of each of the plurality of hollow glass tubes is connected to a female ground glass joint.

Each of the at least one output ports of the manifold is terminated to a male ground glass joint, and each stopcock controls the flow of chemical materials between each of the plurality of input ports of the manifold and each of the at least one output ports of the manifold.

The rotation of each rotating plug is driven by an electrical motor or a servo, and the rotation is sensed by a sensor. The rotation of each rotating plug is controlled by a computer.

At least one of the openings in the rotating plug is elongated in the circumferential direction of the plug.

At least one of the male and female ground glass joint is a conically tapered ground glass joint or a spherical ground glass joint.

BRIEF DESCRIPTION OF THE DRAWINGS

The above and other aspects, features and advantages of the present invention will become more apparent upon consideration of the following description of preferred embodiments taken in conjunction with the accompanying drawing figures. The accompanying figures are examples of the various aspects and features of the present invention and are not limiting either individually or in combination.

FIGS. 5a-5e depict operation of the arrangement depicted in FIGS. 4a-4e.

FIGS. 6a-6j depict a modified plug element provided for by the invention comprising an elongated opening on diametric sides of the plug connected by a hollow passageway through the plug.

FIGS. 7a-7h depict an implementation wherein a stopcock plug internally comprises a movable element that can be controlled by a servo or motor element.

DETAILED DESCRIPTION

In the following description, reference is made to the accompanying drawing figures which form a part hereof, and which show by way of illustration specific embodiments of the invention. It is to be understood by those of ordinary skill in this technological field that other embodiments can be utilized, and structural, electrical, as well as procedural changes can be made without departing from the scope of the present invention. The aspects and features described herein can be used singly or in combination unless specifically stated otherwise.

Furthermore, in the figures, it is to be understood that a significant emphasis has been placed on depicting functionality, structure, and methods regarding many aspects of the invention. In choosing this emphasis, little treatment of aesthetics and visual appeal has been included. It is to be understood that a number of additional techniques of encasement, overlay bezel, alternate structure, ornamental embellishment, etc. can be used to obtain a wide range of aesthetic value and effect.

Review of Traditional Laboratory Glassware Stopcock Technologies

One of the elements to be adapted would be laboratory glassware apparatus stopcocks. Co-pending U.S. patent application Ser. No. 12/899,551 describes approaches to providing servo-controlled adaptors for traditional laboratory glassware apparatus stopcocks.

Most stopcocks offer only limited control of flow rates beyond simple on/off operation. Elongating the passageway opening along the surface and through the stopcock plug into a teardrop shape can increase the usable rotation angle so as to provide the user or a servo system get finer degrees of accuracy in adjustment. In other words a usable rotation angle of rotation would result in a more detailed adjustable flow rate. This has value in both servo-based operation and in hand-based operation. Co-pending U.S. patent application Ser. No. 12/899,551 describes approaches to elongating the passageway opening in the stopcock plug and employing various tapered passageway shape, for example a teardrop shape. In the case of Teflon stopcock plugs it is noted that the near-surface portions of an existing passageway hole in the plug can be carved into an elongated cavity through use of a milling machine.

Figure 1A:
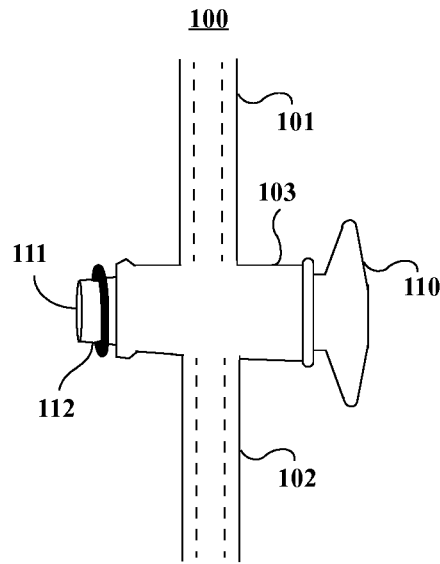
FIGS. 1a-1h depict exemplary structure, components, and operation of a conventional plug-type rotary "stopcock" valve traditionally employed in laboratory glassware.
Figure 1B:
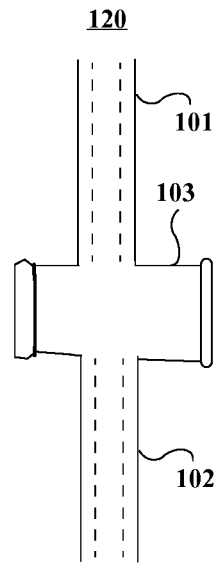
Figure 1C:
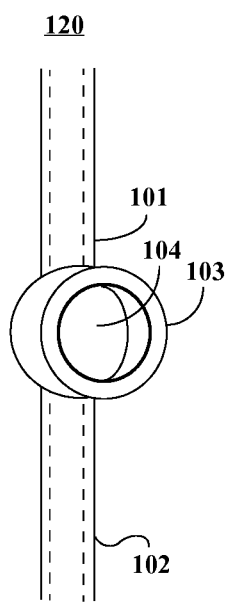

FIGS. 1a-1h depict structure, components, and operation of a conventional plug-type rotary "stopcock" valve traditionally employed in laboratory glassware. Many other types of embodiments exist as is appreciated by one skilled in the art. The conventional lab glassware stopcock depicted in FIG. 1a comprises at least two inflow/outflow tubes 101, 102, and a valve body 103, all typically made of high-performance glass. This portion of the arrangement of FIG. 1a is depicted in two viewing perspectives in FIGS. 1b an 1c. The conventional lab glassware valve body 103 provides an outer encasement and is internally configured with a conical or cylindrical cavity 104 arranged to rotationally accept a plug and handle combination 150 such as shown as in the two viewing perspectives of FIGS. 1d and 1e.

The conventional lab glassware valve body 103 provides both an outer encasement and a conical or cylindrical cavity in which the plug 150 is inserted and rotates within. The plug 150 shown in FIGS. 1d and 1e comprises a shaft region 114 and typically comprises a handle or handle region 110 attached to a shaft or shaft region 114. The two viewing perspectives of FIGS. 1d and 1e differ by a rotation of the plug handle 110 by approximately 90 degrees. There is a passageway 115 through the shaft region 114 of the plug 150. The plug 150 also typically comprises an end-cap region 111 that features a groove 116 for accepting a securing grommet, elastic ring, or clip such as the one 112 depicted in FIG. 1a. The handle 110 can be angularly rotated, for example by hand, to various other positions 110a-110c as suggested in FIG. 1f. Typically the plug is free to rotate a full 360 degrees, but only a narrow range of angles permit flow through the stopcock.

Many other forms and types of each of these elements and their component parts known by one skilled in the art, for example ones with additional outlet inlet tubes connecting with the valve body 103 and with additional passageways through the plug.

Traditionally the passageway 115 through the shaft region 114 of the plug 150 is of small diameter relative to the diameter of the shaft region 114 of the plug 150, and typically is of comparable size to the internal open diameter of the inflow/outflow tubes 101, 102. Additionally, the cavity in the valve body 103, the plug 150, the inflow/outflow tubes 101, 102, and the passageway 115 through the plug 150 are arranged so that:

The plug 150 can be turned to a first range of angular positions wherein the passageway 115 through the plug 150 meets at least in part an internal open aperture through the encasement connecting to the open volumes within of the inflow/outflow tubes 101, 102. In this first range of angular positions, flow through the inflow/outflow tubes 101, 102 can occur via the passageway 115 through the plug 150. When the passageway is fully aligned with the inflow/outflow tubes 101, 102, maximal flow can occur. When the passageway is partially aligned with the inflow/outflow tubes b, a reduced rate of flow can occur.

Outside this first range of angular positions, the passageway 115 through the plug 150 is configured to not align with the internal open diameter of the inflow/outflow tubes 101, 102. In this case, flow through the inflow/outflow tubes 101, 102 is blocked.

Figure 1D:
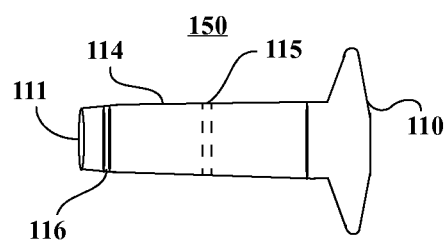
Figure 1E:
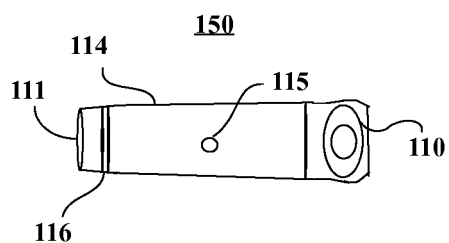
Figure 1F:
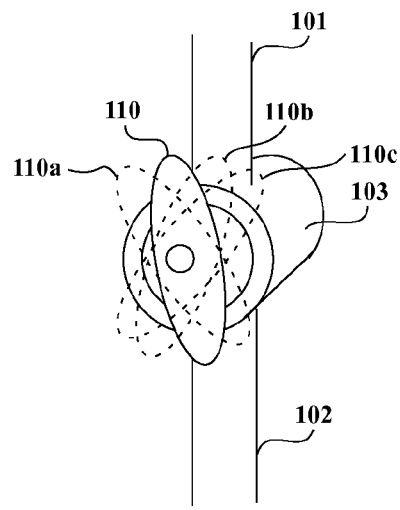
Figure 1G:
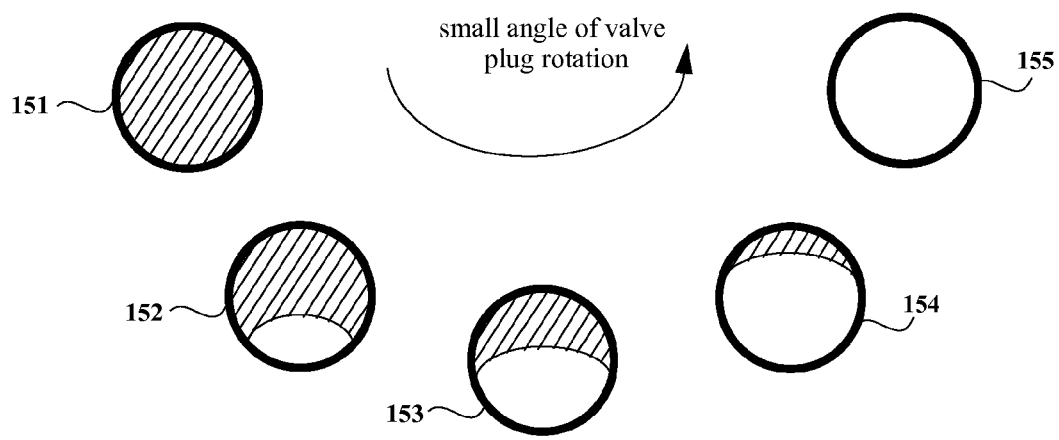
Figure 1H:
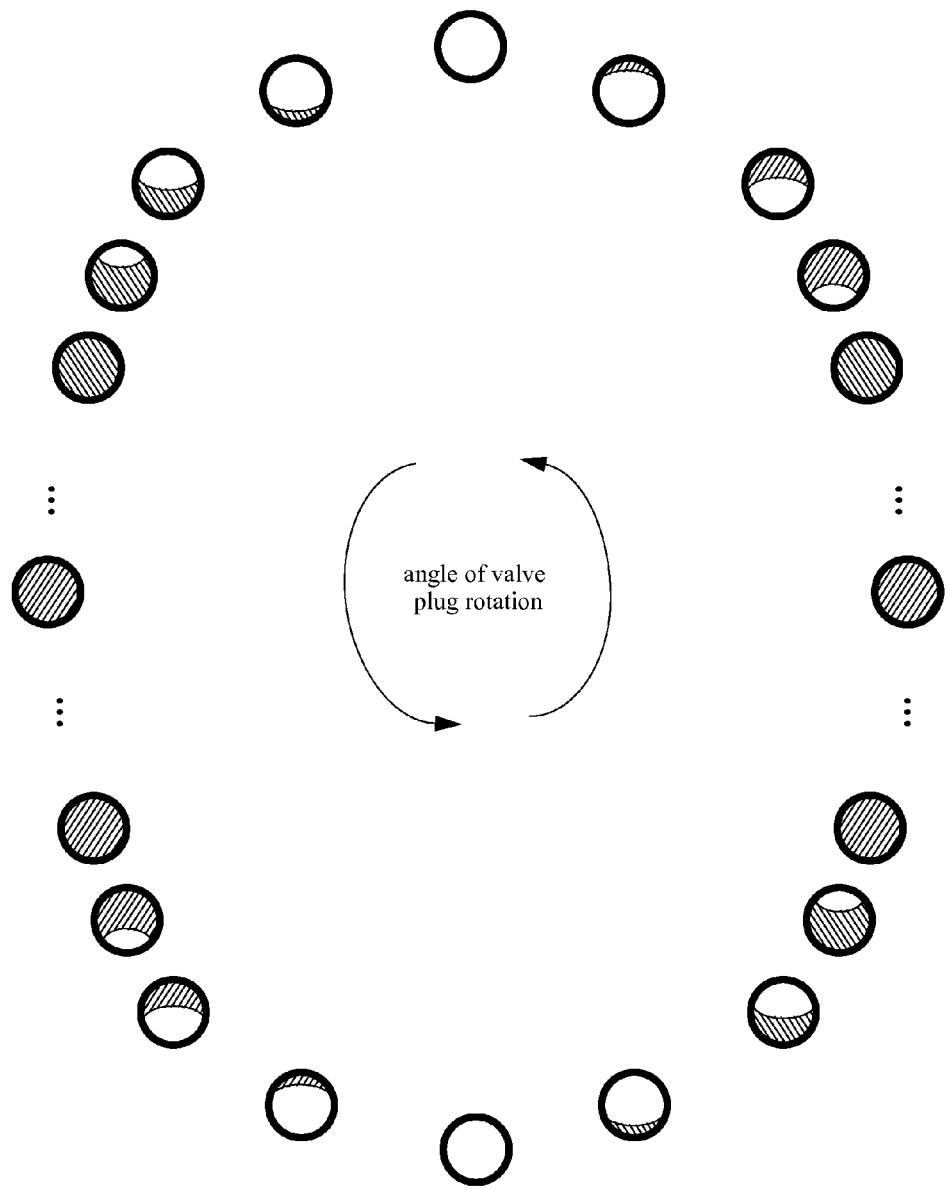

FIG. 1g shows additional detail of the alignment of the passageway 115 through the plug with the apertures through the encasement connecting to the inflow/outflow tubes 101, 102. The example alignments depicted in FIG. 1g include a fully-blocked case 151, a fully-open case 155, and various partially-open cases 152-154 permitting various amounts of flow through the plug 150 as increasing fractions of the passageway aligns with the aperture. As the stopcock handle is rotated, the exposed cross-section of the plug passageway 114 that aligns with the apertures through the encasement connecting to the inflow/outflow tubes 101, 102 that, for example, had been blocked (say with handle position 110a in FIG. 1f) becomes (as the handle is rotated through the continuous range of positions that include 110, 110b, 110c)

increasing larger 152-154 until the entire area of the cavity becomes fully opened 155 and then becomes smaller again until the passageway is not exposed and the aperture is completely blocked.

As mentioned above, typically the plug is free to rotate a full 360 degrees, but only a narrow range of angles permit flow through the stopcock. This is because traditionally the passageway 115 through the plug 150 is of small diameter, in particular typically of a diameter comparable to the internal open diameter of the inflow/outflow tubes 101, 102, the range of angular positions that permits flow is relatively small. Thus, most of the 360 degrees of angular rotation of the handle (and attached plug) deliver blocked flow, and only a small angle of rotation provides flow through the stopcock, as suggested in FIG. 1*h*. Because the passageway 115 through the plug 114 is typically symmetric, any two handle 110 (and associated plug 114) positions that exactly differ by 180 degrees of rotation provides the same flow behavior, as suggested in FIG. 1*h*.

Further, because only a small angle of rotation provides flow through the stopcock, it is typically extremely difficult to even roughly control the partial flow rate through the stopcock by selectively rotating the handle 110 to a specific range of desired partial flow positions (i.e., such as 152-154 in FIG. 1*g*.

As mentioned earlier, many other forms and types of each of these elements and their component parts known by one skilled in the art, for example ones with additional outlet inlet tubes connecting with the valve body 103 and with additional passageways through the plug.

Figure 2A:
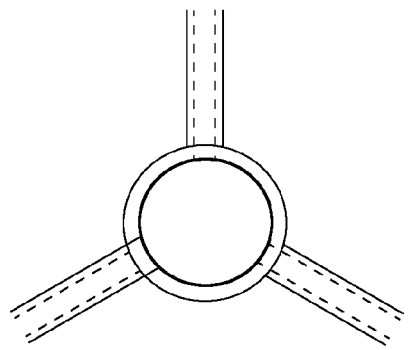
FIGS. 2a-2f depict a structure, components, and operation of a conventional plug-type rotary "stopcock" valve traditionally employed in laboratory glassware wherein a third inlet/outlet tube is provided.
Figure 2B:
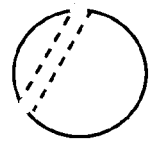
Figure 2C:
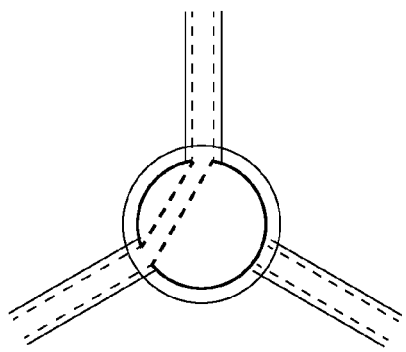
Figure 2D:
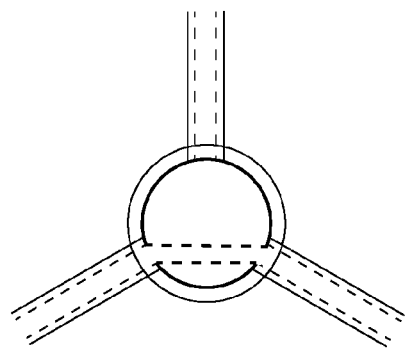
Figure 2E:
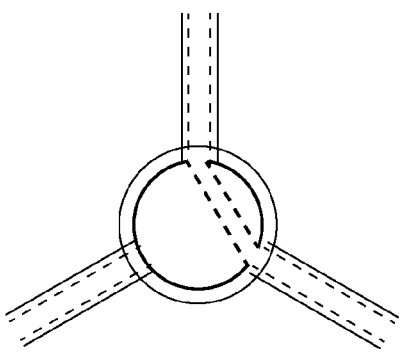
Figure 2F:
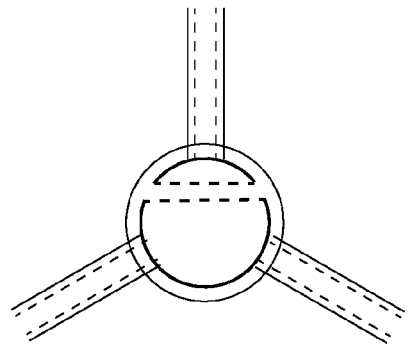

For example, FIGS. 2*a*-2*f* depict a structure, components, and operation of a conventional plug-type rotary "stopcock" valve traditionally employed in laboratory glassware wherein a third inlet/outlet tube is provided. FIG. 2*a* depicts a conventional lab glassware valve body again comprising an outer encasement and is internally configured with a conical or cylindrical cavity arranged to rotationally accept a rotary plug and handle combination. FIG. 2*b* depicts a cross-section view of a plug illustrating in dashed lines a single passageway borehole through the plug. FIGS. 2*c*-2*e* depict three possible flow paths through the passageway that can be selected through rotation of the plug. Note these are mutually exclusive and that there is no mode allowing all three inlet/outlet tubes to be simultaneously interconnected. FIG. 2*f* depicts an exemplary rotational position of the plug that blocks all flow through the stopcock.

Figure 3A:
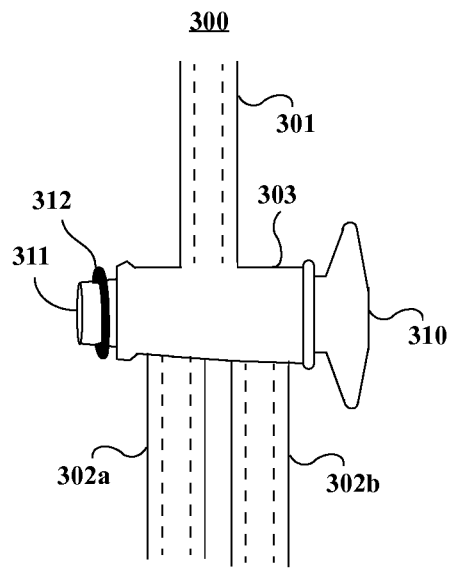
FIGS. 3a-3d depict another structure, components, and operation of a conventional plug-type rotary "stopcock" valve traditionally employed in laboratory glassware wherein a third inlet/outlet tube is provided.
Figure 3B:
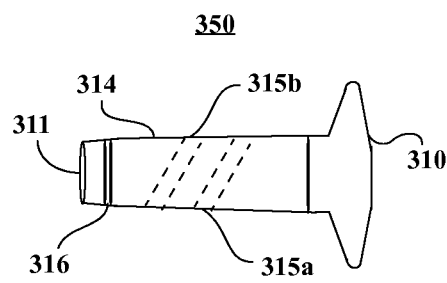
Figure 3C:
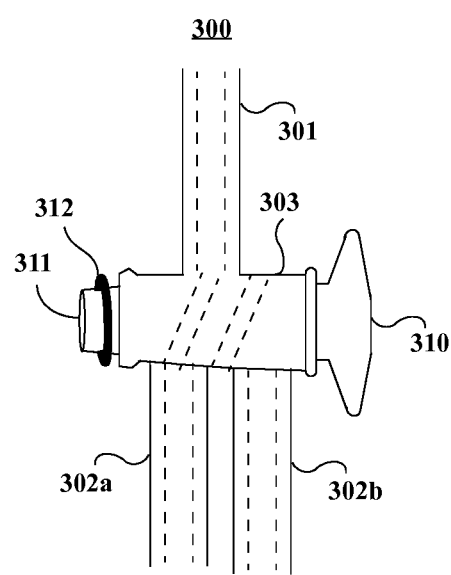
Figure 3D:
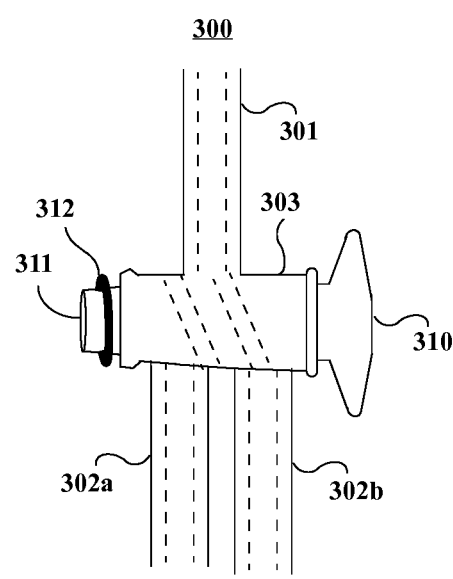

FIGS. 3*a*-3*d* depict a second structure, components, and operation of a conventional plug-type rotary "stopcock" valve traditionally employed in laboratory glassware wherein three inlet/outlet tubes 301, 302*a*, 302*b* are provided. FIG. 3*a* depicts a conventional lab glassware valve body 303 again comprising an outer encasement and is internally configured with a conical or cylindrical cavity arranged to rotationally accept a rotary plug and handle combination (comprising for example visible elements 310 and 311). FIG. 3*b* depicts a cross-section view of a plug arrangement 350 illustrating in dashed lines two slanted passageway boreholes 315*a*, 315*b* through the plug body 314. The plug 350 also typically comprises an end-cap region 311 that features a groove 316 for accepting a securing grommet, elastic ring, or clip such as the one 312 depicted in FIG. 3*a*. FIGS. 3*c*-3*d* depict two possible flow path modes that can be selected through rotation of the plug. In this example, the associated angular positions of these two flow modes are separated by 180 degrees of rotation. Note these two flow modes are mutually exclusive and that there is no mode allowing all three inlet/outlet tubes to be simultaneously interconnected. The flow can be completely blocked by rotating the plug to any one of a range of angular positions where the passageway boreholes 315*a*, 315*b* do not line up with the inlet/outlet tubes 301, 302*a*, 302*b*.

Although not found in traditional glassware, it is inventively noted that the two slanted passageway boreholes 315*a*, 315*b* through the plug body 314 need not be coplanar. For example, one of the two slanted passageway boreholes 315*a*, 315*b* through the plug body 314 can be oriented 90 degrees from the orientation depicted in FIG. 3*b*. In such an arrangement, two possible flow path modes can still be selected through rotation of the plug, however here the associated angular positions of these two flow modes are separated by 90 degrees of rotation. Again these two flow modes are mutually exclusive and there is no mode allowing all three inlet/outlet tubes to be simultaneously interconnected. The flow can be completely blocked by rotating the plug to any one of a range of angular positions where the passageway boreholes do not line up with the inlet/outlet tubes 301, 302*a*, 302*b*.

Figure 4C:
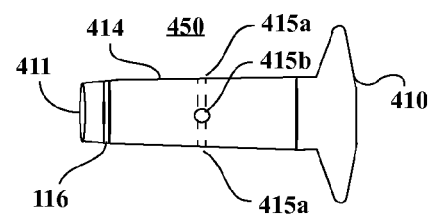
FIGS. 4a-4e depict another structure and components of a conventional plug-type rotary "stopcock" valve traditionally employed in laboratory glassware wherein a third inlet/outlet tube is provided.
Figure 4A:
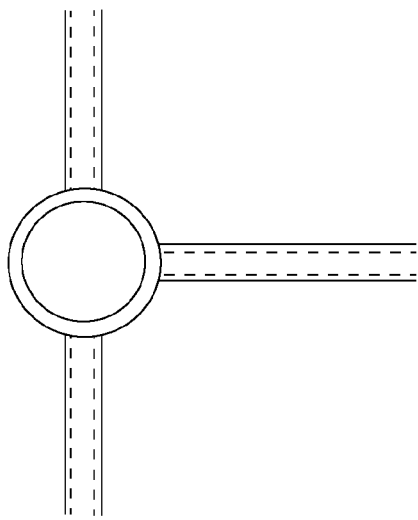
Figure 4D:
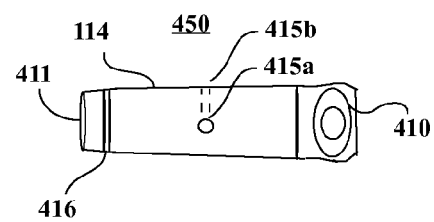
Figure 4B:
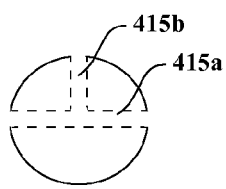

FIGS. 4*a*-4*e* depict a third structure and components of a conventional plug-type rotary "stopcock" valve traditionally employed in laboratory glassware wherein three inlet/outlet tubes are provided. FIG. 4*a* depicts a conventional lab glassware valve body again comprising an outer encasement and is internally configured with a conical or cylindrical cavity arranged to rotationally accept a rotary plug and handle combination. FIG. 4*b* depicts a cross-section view of a plug illustrating in dashed lines a "T"-shaped (three-opening) passageway through the plug. The a "T"-shape can be realized, for example by drilling or casting-out a radial (half-diameter) length borehole intersecting and perpendicular to the passageway 115 of in the plug body 114 depicted in FIG. 1*d*. The plug 450 also typically comprises an end-cap region 411 terminating the plug body 414; the end-cap region 411 can comprise a groove 416 for accepting a securing grommet, elastic ring, or clip.

Figure 4E:
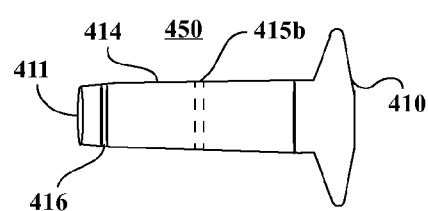

FIG. 4*c* depicts an exemplary side view of the full plug 450 wherein the radial length borehole 415*b* faces towards the reader and the diameter-length passageway 415*a* is positioned vertically. FIG. 4*d* depicts an exemplary side view of the full plug 450 wherein plug handle of FIG. 4*c* has been rotated by 90 degrees in a direction so that the radial length borehole 415*b* is facing upwards and the diameter-length passageway 415*a* faces the reader. FIG. 4*e* depicts an exemplary side view of the full plug 450 wherein plug handle of FIG. 4*d* has been further rotated by 90 degrees in the same direction so that the diameter-length passageway 415*a* is now positioned vertically but the radial length borehole 415*b* faces away from the reader. FIGS. 5*a*-5*d* depict four possible flow paths through the passageway that can be selected through rotation of the plug:

With the plug 450 rotationally positioned as shown in FIG. 5*a*, the top and bottom inlet/outlet tubes are interconnected;

With the plug 450 rotationally positioned as shown in FIG. 5*b*, the top and side inlet/outlet tubes are interconnected;

With the plug 450 rotationally positioned as shown in FIG. 5*c*, the side and bottom inlet/outlet tubes are interconnected;

With the plug 450 rotationally positioned as shown in FIG. 5*d*, all three (i.e., top, side and bottom) inlet/outlet tubes are interconnected FIG. 5*e* depicts an exemplary rotational position of the plug that blocks all flow through the stopcock.

In addition to the types of stopcocks presented above, some laboratory glassware employs another type of valve structure typically referred to as "metering valves." These comprise a threaded element providing multi-turn fine adjustment of flow through the valve. However, these are expensive and rarely used in stock glassware.

Converting Laboratory Glassware Stopcock Technologies into Metering Valves

The present invention includes provisions for employing at least one elongated opening in the plug arranged so that the cross-sectional area of the flow path more gradually changes as the plug is rotated. For example, the angular positions permitting flow can be accordingly be expanded from just a few degrees of rotation to much larger ranges, even approaching just short of 180 degrees of rotation. As taught in co-pending U.S. patent application Ser. No. 12/899,551, the sape of the elongated opening in the plug can be designed to provide gradually changes in the flow as the plug is rotated, and further can be designed to provide desired variation in cross-sectional area permitting flow through the plug as a function of plug rotation angle.

The plug body is depicted as longitudinally cylindrical, but the same principles apply for a longitudinally conical plug body as well as a spherical ("ball valve") rotating member.

FIGS. 6a-6j depicts a portion of an exemplary plug element provided for by the invention comprising an elongated opening on diametric sides of the plug connected by a hollow passageway through the plug. Such an elongated opening provides a cross-sectional area as presented to the stopcock aperture that varies monotonically with the rotational angle for at least a portion of the permitted rotation angle. Here the elongated opening on diametric sides of the plug is drawn as teardrop-shaped, but other types of shapes and variations in local convexity in various portions of the shape are possible.

Figure 6A:
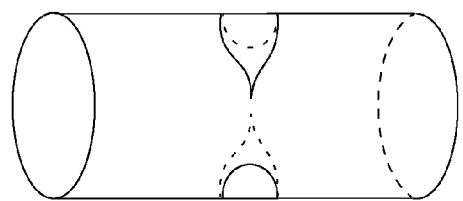
Figure 6B:
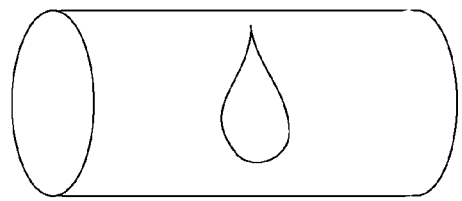
Figure 6C:
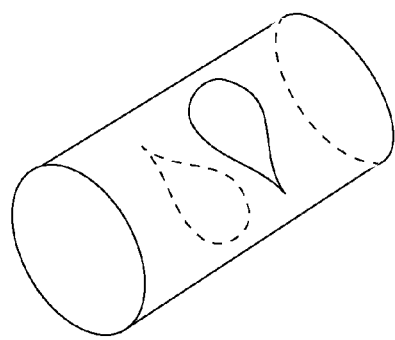
Figure 6D:
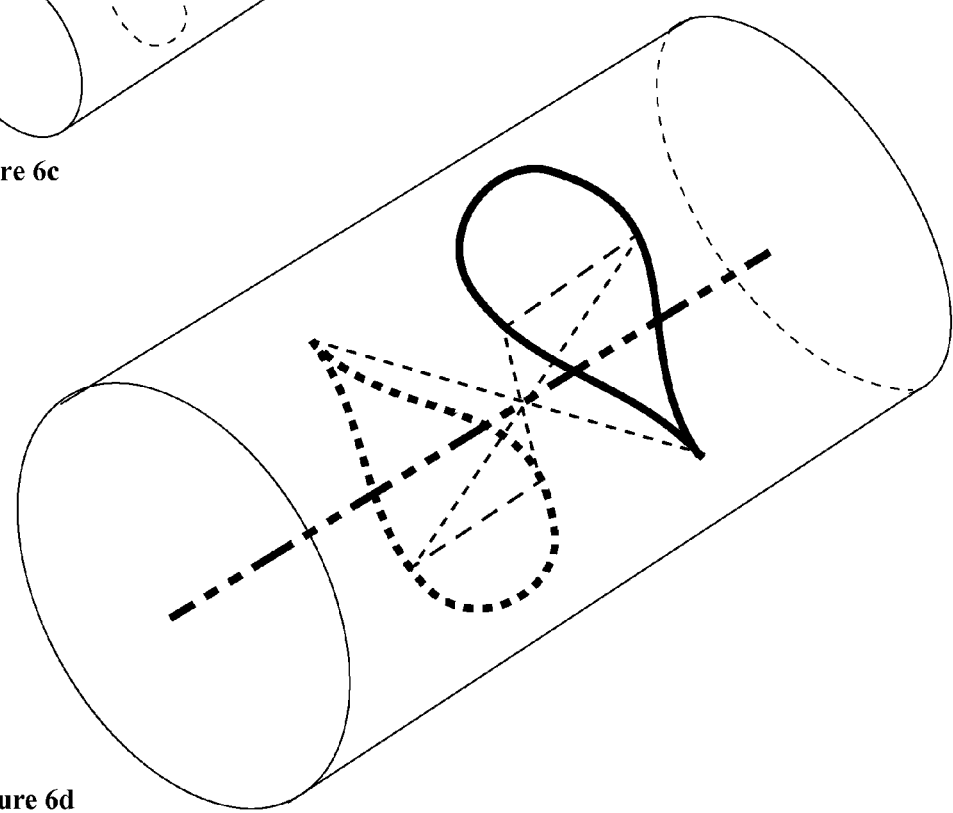
Figures 6E, 6F:
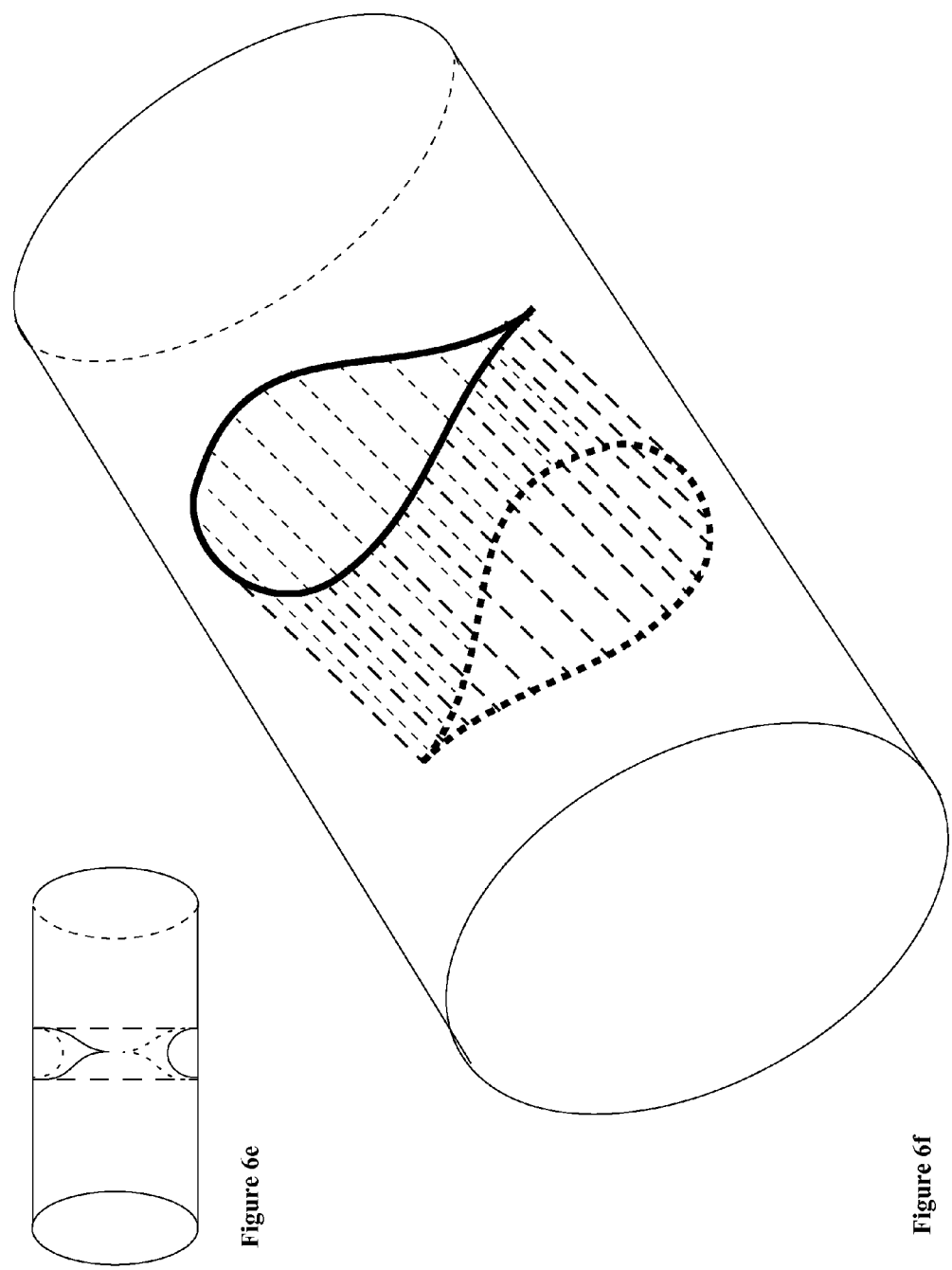

FIG. 6a depicts a side view of the plug. Here only partial views of these two openings in the plug are directly visible, and obscured portions of the openings are rendered in dashed lines. FIG. 6b shows the same plug rotated about a 90-degree angle wherein one of the elongated openings is fully visible to the reader and the corresponding opening on the opposite side of the plug is not seen. FIG. 6c shows a spatially rotated view wherein one of the elongated openings is fully visible to the reader and the corresponding opening on the opposite side of the plug is rendered in dashed lines. In this example the elongated openings are aligned and oriented so that the width of the opening of one opening (as measured with respect to the length of the plug) is the same as the width of the opening of the opposite opening (as measured with respect to the length of the plug) as projected through the centerline of the length of the plug. Two examples of such width matching through the centerline are shown in FIG. 6d. Although other configurations are possible and provided for by the invention, the alignment and orientation causes each aperture (of the valve body connecting to the two inlet/outlet tubes) to be presented with the same cross-sectional area at each position of angular plug rotation as taught in co-pending U.S. patent application Ser. No. 12/899,551. FIG. 6e shows a view of FIG. 6a wherein the two openings are connected by a passageway. FIG. 6f shows the 3D outline of the passageway in more detail.

FIGS. 6g-6i depict the general principles described above with an alternate treatment of the passageway between the elongated openings. FIG. 6g shows a presentation of FIG. 6b wherein the elongated opening on the opposite side of the plug is shown in dashed lines. Accordingly, FIG. 6g amounts to a 90 degree rotation of the depiction in FIG. 6e about the longitudinal axis of the plug 600, but also shows a circular opening to the passageway joining the two enlongated openings. In this approach the opening is cylindrically shaped or nearly-cylindrically shaped, the cylinder comprising a radius equal to or nearly-equal to widest portion of the elongated opening, as suggested in FIG. 6i. Note that if the passageway is circularly-cylindrically shaped, the widest portion of elongated openings can conform to this circular curvature. The invention provides for the non-circular cross-section cylindrically shaped passageways, for example as can be cast in a polymer or glass plug body allowing non-circular curvature in the widest areas of the elongated openings advantageous in certain flow designs, for example the more general versions of elongated opening designs.

FIG. 6h depicts a first orthogonal side ("A-A") view of the arrangement depicted in FIG. 6g. In this arrangement, each elongated opening exposes a corresponding cavity 601, 602 which are joined by a passageway 603. In one implementation, the passageway 603 is diametrically aligned in the plug, and for example may resultantly interface the cavities 601, 602 at an angle as depicted in the second orthogonal side ("B-B") view of the arrangement depicted in FIG. 6j. It is noted that although the cavities 601, 602 depicted the arrangement depicted in FIG. 6j are depicted with flat basins, the cavity basins in general can be of a wide variety of shapes involving one or more locally curved or planar surfaces.

As a first example of the invention, the arrangements described above in conjunction with FIGS. 6a-6i can be used to replace, for example, the body portion 114 of plug 150 depicted in FIGS. 1d and 1e.

As a second example of the invention, the elongated opening and passageway can be incorporated into the body portion 114 of plug 150 depicted in FIGS. 1d and 1e and rendered on a slant so as to produce an alignment such as that depicted in FIG. 2b, adapting it for use in the three inlet/outlet valve described earlier in conjunction with FIGS. 2a-2f.

As a third example of the invention, in a similar fashion, a second such elongated opening and diameter-length passageway can be incorporated into the body portion 114 of plug 150 depicted in FIGS. 1d and 1e and rendered on a slant so as to produce an alignment such as that depicted in FIG. 3b. This results in an adaptation for use in the three inlet/outlet valve described earlier in conjunction with FIGS. 3a-3d.

As a fourth example of the invention, the second such elongated opening and passageway described above can be oriented at 90 degrees to that of the first elongated opening and passageway.

As a fifth example of the invention, a second such elongated opening and radial-length passageway can be incorporated into the body portion 114 of plug 150 depicted in FIGS. 1d and 1e and rendered to perpendicularly intersect the first elongated opening and passageway can be incorporated into the body portion 114 of plug 150 in an alignment such as that depicted in FIG. 4b. This results in an adaptation for use in the three inlet/outlet valve described earlier in conjunction with FIGS. 4a-4e and FIGS. 5a-5e.

Accordingly with the above teachings and their natural extensions as is clear to one skilled in the art, the present invention provides for employing at least one elongated opening in the plug arranged so that the cross-sectional area of the flowpath more gradually changes as the plug is rotated. As a result, the angular positions permitting flow can be accordingly be expanded from just a few degrees of rotation to much larger ranges, even approaching just short of 180 degrees of rotation for some arrangements (first and third embodiments), just short of 135 degrees of rotation for other arrangements (some forms of fourth embodiments), just short of 90 degrees of rotation for other arrangements (fifth and other forms of fourth embodiments), and just short of 60 degrees of rotation for yet other arrangements (second embodiment).

The resulting arrangement allows for the control of flow through a conventional stopcock comprised by conventional glassware.

Providing Servo-Controlled Operation of Traditional and "Metered" Laboratory Glassware Stopcock Technologies The above arrangements can be employed in larger arrangements providing electrically controlled valves so as to reliably control the transport flows in of, out of, and among vessels. These can be in turn used in creating automated environments employing conventional laboratory glassware, for example under the control of a computer.

An approach to adding servo or motor control to the angle of rotation of the plug in a laboratory stopcock, particularly for including rotating stopcock plug elements with increased usable rotation angle plugs as taught in co-pending U.S. patent application Ser. No. 12/899,551 involves implementing a second interior rotatable plug structure within the stopcock plug itself, creating a concentric rotating plug hierarchy. This rotating plug hierarchy in turn can be inserted into the glassware stopcock encasement. The inner plug can be rotated by servo or motor, while the outer plug can be rotated by hand. Additionally, a handle can be attached to permit traditional hand-operation of the stopcock.

FIGS. 7a-7e illustrates a first approach taught in co-pending U.S. patent application Ser. No. 12/899,551 wherein a stopcock plug internally comprises a movable element that can be controlled by a servo or motor element. FIG. 7a depicts and exemplary plug body, akin to that of the plug body 114 in FIGS. 1d-1e, plug body 314 in FIG. 3b, and plug body 414 in FIGS. 4c-4e. The plug body here, however, internally comprises a coaxial hollow cylindrical opening in which a smaller cylindrical plug, such as that depicted in 7b, can be inserted. In an embodiment, smaller cylindrical plug comprises the elongated openings, at least one rotational bearing or shaft, and at least one drive coupling or gear. The smaller cylindrical plug element can designed according to the general aspects of the invention described above. The combination of the exemplary hollow plug body and the smaller cylindrical plug is depicted in FIG. 7c and is arranged so that the combination can be inserted in the conical or cylindrical cavity 104 of a stopcock. The resulting arrangement allows for the control of flow through a conventional stopcock comprised by conventional glassware by two means; rotating the hollow plug body (depicted in FIG. 7a) within the conical or cylindrical cavity 104 of a stopcock, and rotating the smaller cylindrical plug (depicted in FIG. 7b) within the hollow plug body (depicted in FIG. 7a).

As described below, each of these rotations can be performed by one or both of manual operation (via a handle) and motorized operation via an electrical motor attachment such as that depicted in FIG. 7d.

A traditional stopcock end-fastener (such as a spring clip) can be used to hold the motor controlled stopcock plug in place within the stopcock glassware encasement. Additionally, a handle can be attached to permit traditional hand-operation of the stopcock.

In an implementation a cap, such as depicted in FIG. 7e, can be used to terminate one end of the combination depicted in FIG. 7c. In an embodiment, the cap can include a groove for accepting a securing grommet, elastic ring, or clip such as the one 112 depicted in FIG. 1a. In another embodiment, the cap can attach to a handle such as that depicted in FIG. 7f. In another embodiment, the cap can itself comprise a handle such as that depicted in FIG. 7f.

The handle can be used to manually rotate by hand the hollow plug body (depicted in FIG. 7a) within the conical or cylindrical cavity 104 of a stopcock. The handle can be used to manually rotate by hand the smaller cylindrical plug (depicted in FIG. 7b) within the hollow plug body (depicted in FIG. 7a). The handle can comprise two separately rotatable coaxial sections, one of which via mechanical connection can be used to manually rotate by hand the smaller cylindrical plug (depicted in FIG. 7b) and the other of which via mechanical connection can be used to manually rotate by hand the hollow plug body (depicted in FIG. 7a). The handle can comprise two longitudinally-selectable positions (i.e., a push-pull selection), one position of which via mechanical connection can be used to manually rotate by hand the smaller cylindrical plug (depicted in FIG. 7b) and the other of which via mechanical connection can be used to manually rotate by hand the hollow plug body (depicted in FIG. 7a).

Figure 7G:
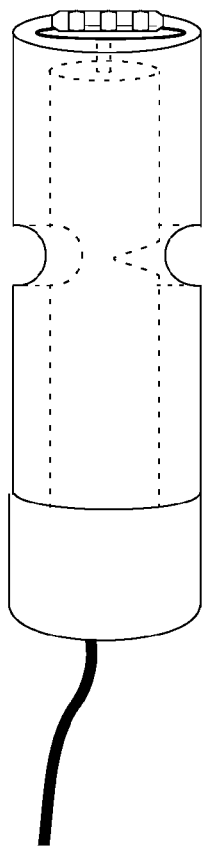
Figure 7H:
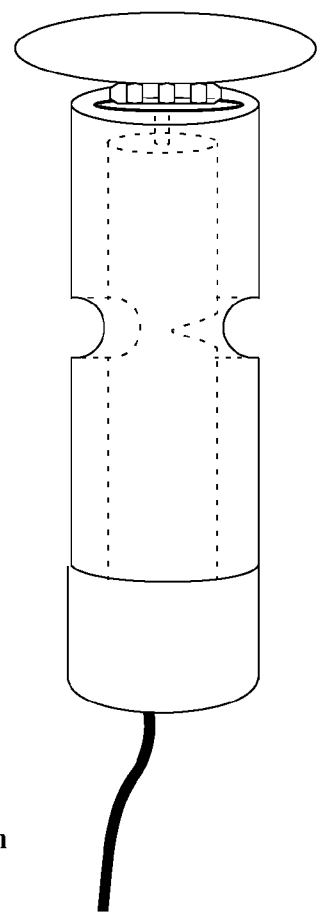

An electrical motor attachment such as that depicted in FIG. 7d can be secured to the combination (of the hollow plug body and the smaller cylindrical plug) depicted in FIG. 7c via fasteners so as to create an electrically powered plug module such as those depicted in FIG. 7g (without hand-operated rotational handle) or FIG. 7h (with hand-operated rotational handle). The electrical motor attachment comprises a power and/or control cable; in an embodiment, such a cable is flexible enough to readily permit rotation of the electrical motor attachment within the conical or cylindrical cavity 104 of a stopcock.

Figure 8A:
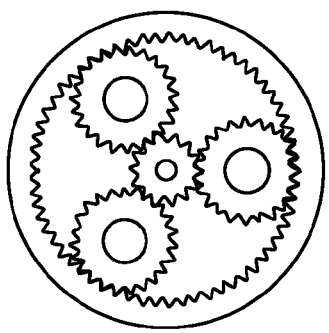
FIG. 8a depicts a front view of an epicyclic ("planetary") gear arrangement.
Figure 8B:
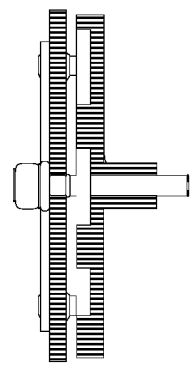
FIG. 8b depicts a size view of an epicyclic gear arrangement.

The electrical motor attachment depicted in FIG. 7d can comprise a servo-motor, stepper motor, conventional DC motor, etc. In some embodiments, a motor shaft or other rotational mechanical element directly or indirectly driven by the servo-motor, stepper motor, conventional DC motor, etc. can be outfitted with position sensing. In an implementation, the electrical motor attachment comprises a gear arrangement linking the servo-motor, stepper motor, conventional DC motor, etc. with a rotation element within the hollow plug body (depicted in FIG. 7a), for example the smaller cylindrical plug (depicted in FIG. 7b) or other structures such as an further example to be described later. In an implementation, the gear arrangement comprises an epicyclic (also known as "planetary") gear arrangement. FIG. 8a shows the front view of an exemplary epicyclic gear arrangement. Use of an epicyclic gear arrangement to link the motor and rotating elements within the plug body provides many advantages including:

Small compact size (FIG. 8b depicts an exemplary size view, demonstrating the remarkable degree of "flatness" of the gear arrangement);

Capability of providing high-torque output;

Range of effective (input-output) gear ratios;

High efficiency (work losses typically ~3-5% per planetary stage);

Exceptional load distribution among components;

Greater operational stability and resulting smoother operation.

In general an epicyclic gear arrangement comprises a single central "sun" gear, an associated plurality of "planet" gears, an arm holding each of the associated plurality of "planet" gears via a rotational bearing, and an outer "annulus" (also called "ring") gear. In general any of the "sun" gear, associated "planet" gears, arm, or outer "annulus"/"ring" gear can serve as a rotational input, rotational output, or stationary element. A typical operational relationship is:

$$\frac{N_{sun}}{N_{ring}} = \frac{\omega_{arm} - \omega_{ring}}{\omega_{sun} - \omega_{arm}}$$

where the "N" variables denote the number of teeth for the subscripted gear and the "ω" variables denote the angular momentum of the subscripted element. A fixed (secured to not rotate) element would have an angular momentum "ω" variable value of zero. It can be shown that the lowest possible gear ratio (i.e., maximizing delivered torque) obtainable results from designs that fix the annulus so it does not rotate and using the "sun" gear as the input. There are other design equations known to one skilled in the art, for example the teeth-matching constraint of $N_{sun}+2N_{planet}=N_{ring}$. Many embellishments also exist, such as the use of "compound planet gears" each of which comprises a two-level gear structure of differing-diameter gears. Also two or more epicyclic gear arrangements can be readily cascaded. Additional epicyclic gear arrangement design methods and aspects can be found, for example, in P. Lynwander's classic 1983 book *Gear Drive Systems: Design and Application* published by Marcel Dekker, New York, ISBN 0824718968, and in either of the 1970 or 1995 version of the Italian text by G. Henriot Gears and Planetary Gear Trains, Brevini, Reggio Emilia, Italy.

Figure 8C:
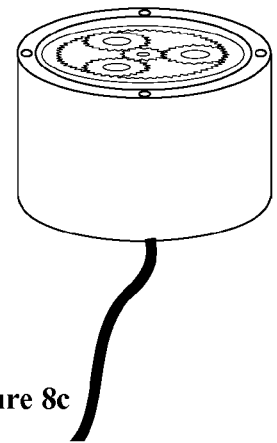
FIG. 8c depicts an implementation wherein the electrical motor attachment depicted in FIG. 7d internally comprises at least one epicyclic gear arrangement.

FIG. 8*c* depicts an example implementation wherein the electrical motor attachment depicted in FIG. 7*d* internally comprises at least one epicyclic gear arrangement. For example, the rotating shaft of the servo-motor, stepper motor, conventional DC motor, etc. can be rotationally coupled to the "sun" gear, the "annulus"/"ring" mechanically connected to the housing of the electrical motor attachment (depicted in FIG. 7*d*) which is also connected (via fasteners shown in FIG. 7*d*) to the exemplary hollow plug body (depicted in FIG. 7*a*). The "arm" of the epicyclic gear arrangement is then rotationally connected to the exemplary smaller cylindrical plug (depicted in FIG. 7*b*) or other structures such as in a next arrangement to be described below.

Figure 9A:
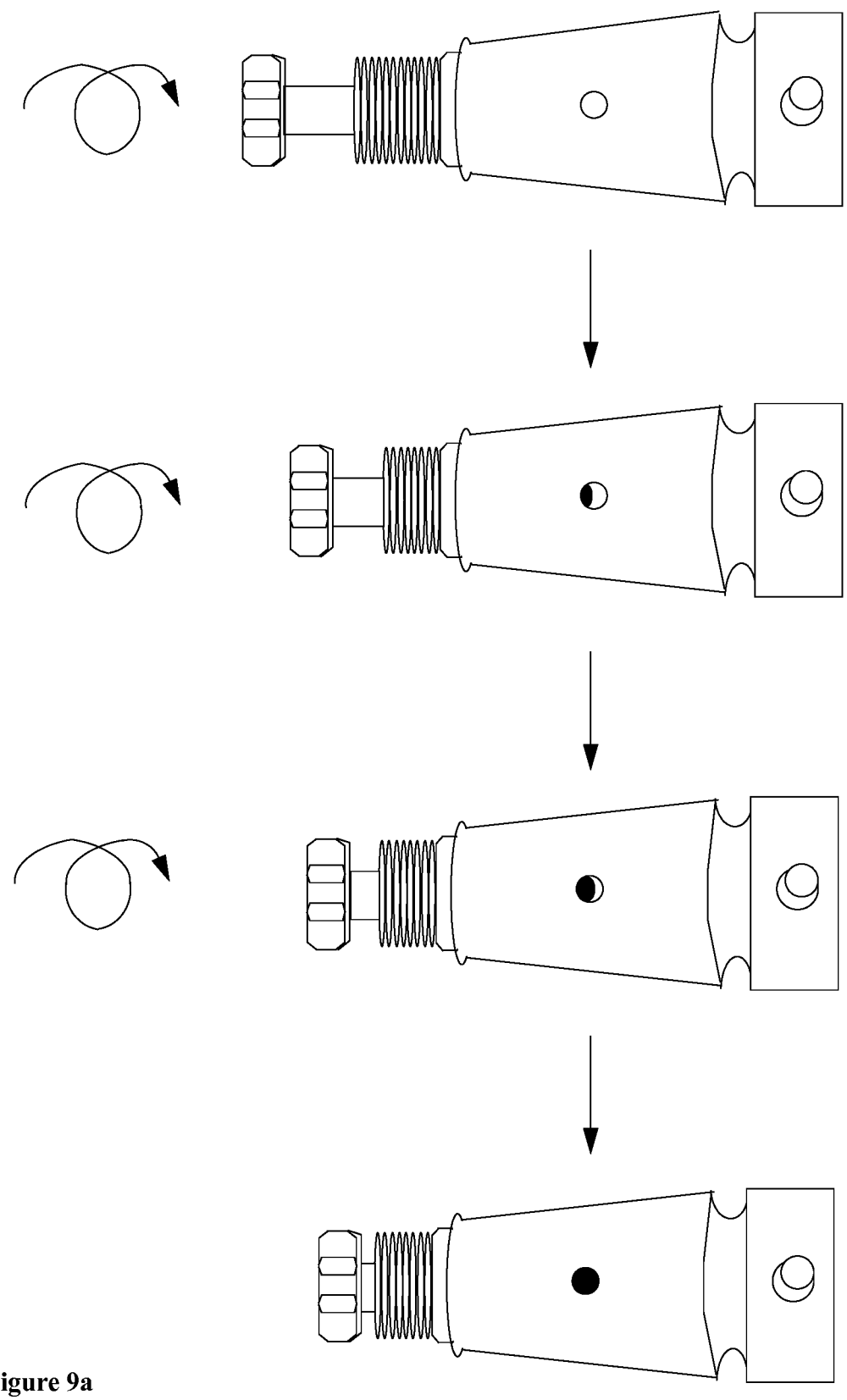
FIGS. 9a-9b illustrate a second type of stopcock flow adjustment wherein a stopcock plug internally comprises a longitudinally-movable gating element.
Figure 9B:
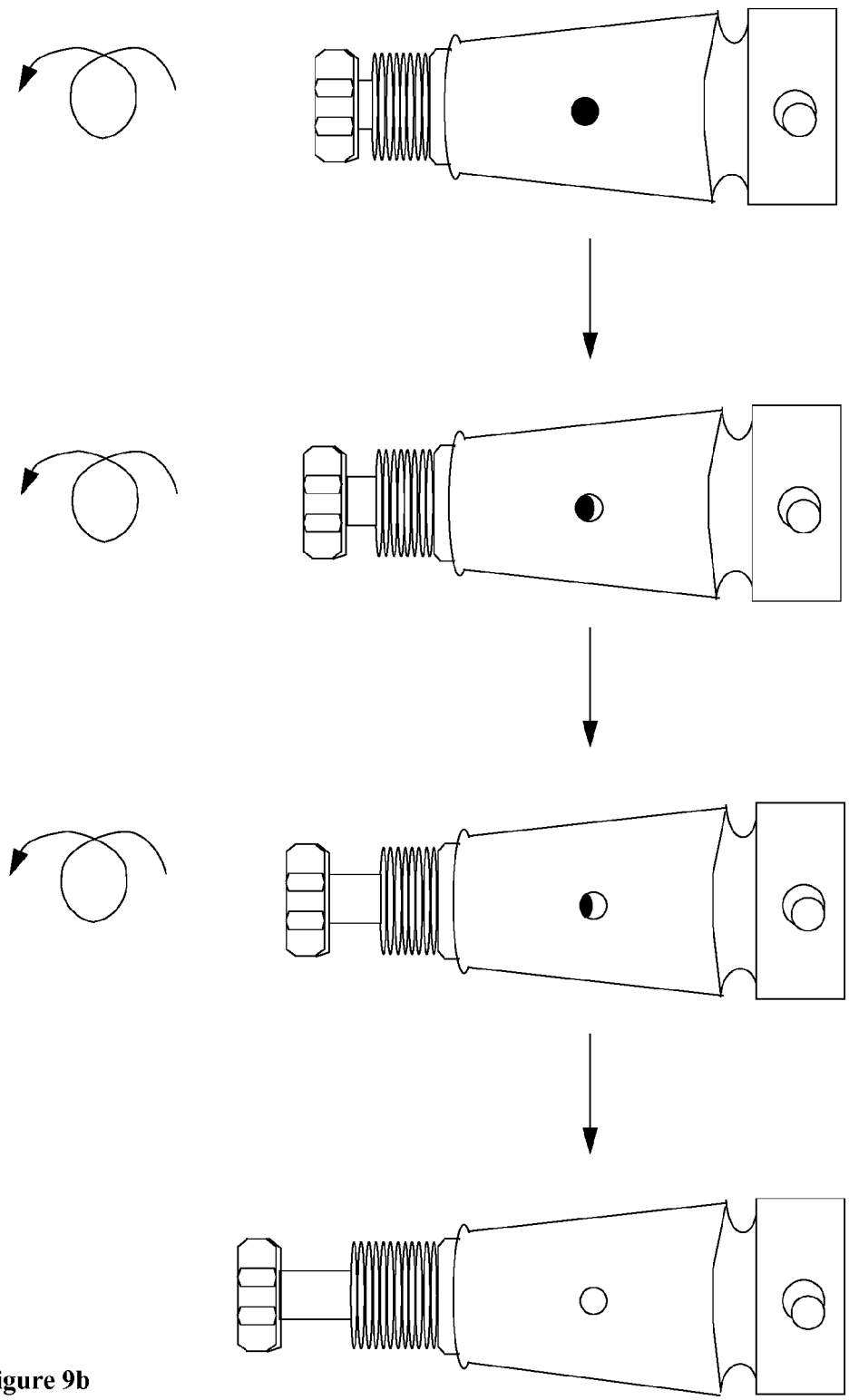
Figure 10A:
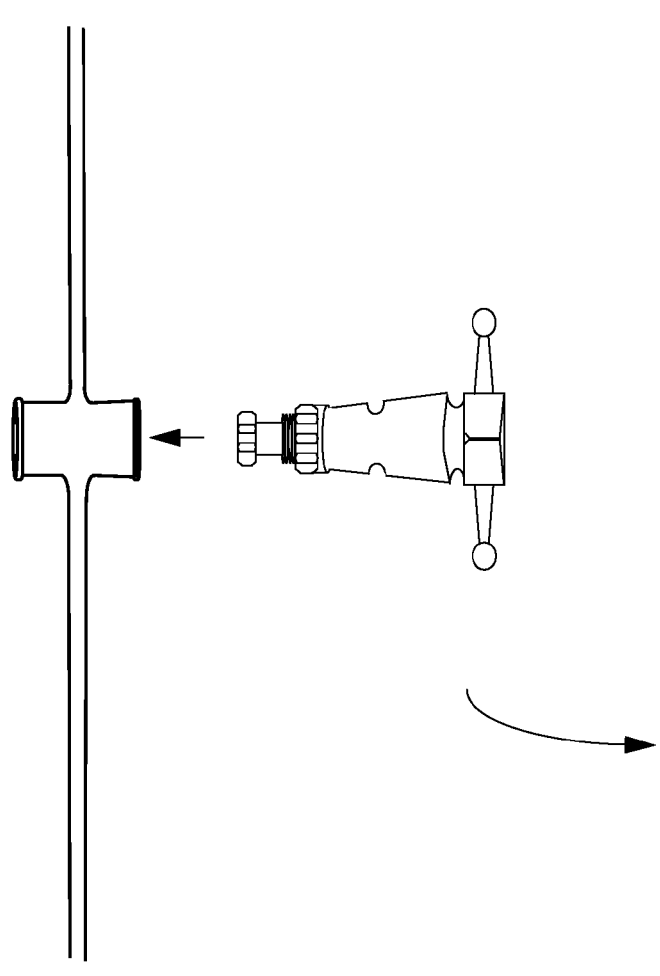
FIGS. 10a-10b depict the arrangements of FIGS. 9a-9b placed into a stockcock body.
Figure 10B:
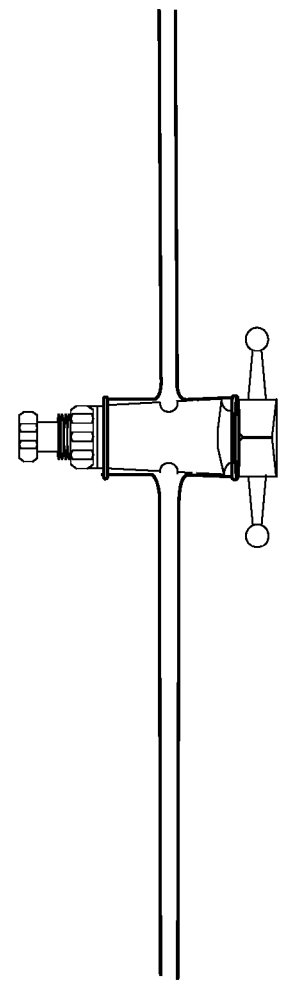

FIGS. 9*a*-9*b* illustrate a second type of stopcock flow adjustment wherein a stopcock plug internally comprises a longitudinally-movable gating element. Here, the cross-sectional area of the opening to the passageway of an otherwise traditional stopcock plug is internally modulated by a longitudinally-movable jaw. The position of the longitudinally-movable jaw is adjusted by a rotating endpiece, for example operating a screw-thread arrangement. As suggested by FIG. 9*a* rotating the endpiece in one angular direction closes the jaw, while rotating the endpiece in the opposite angular direction opens the jaw as suggested by FIG. 9*b*. FIGS. 10*a*-10*b* depict the arrangements of FIGS. 9*a*-9*b* placed into a stockcock encasement such as that depicted in FIGS. 1*b* and 1*c*.

A stopcock plug internally comprising such a longitudinally-movable gating element can be controlled by a servo or motor. The internal movable jaw can be rotationally coupled to a servo or motor and in some embodiments can be outfitted with position sensing. A traditional stopcock end-fastener can be used to hold the servo or motor controlled stopcock plug in place within the stopcock glassware encasement. Additionally, a handle can be attached to permit traditional hand-operation of the plug and/or jaw.

An electrical motor attachment (such as depicted in FIG. 7*d*) is used to operate the longitudinally-movable gating element so as to internally modulate the cross-sectional area of the stopcock plug passageway. In an application, this arrangement can be used to control the flow through the stopcock instead of the arrangement of FIG. 7*a*-7*g*. In another application, this arrangement can be combined with the arrangement of FIG. 7*a*-7*g* so as to provide additional control of the flow through the stopcock.

In one approach, a separate electrical motor attachment is used for this purpose. In another approach, an electrical motor attachment (such as depicted in FIG. 7*d*) can comprise two separately controlled rotational outputs, one directed to rotating the exemplary smaller cylindrical plug (depicted in FIG. 7*b*) and the other for moving a longitudinally-movable gating element so as to internally modulate the cross-sectional area of the stopcock plug passageway.

Figures 11A, 11B:
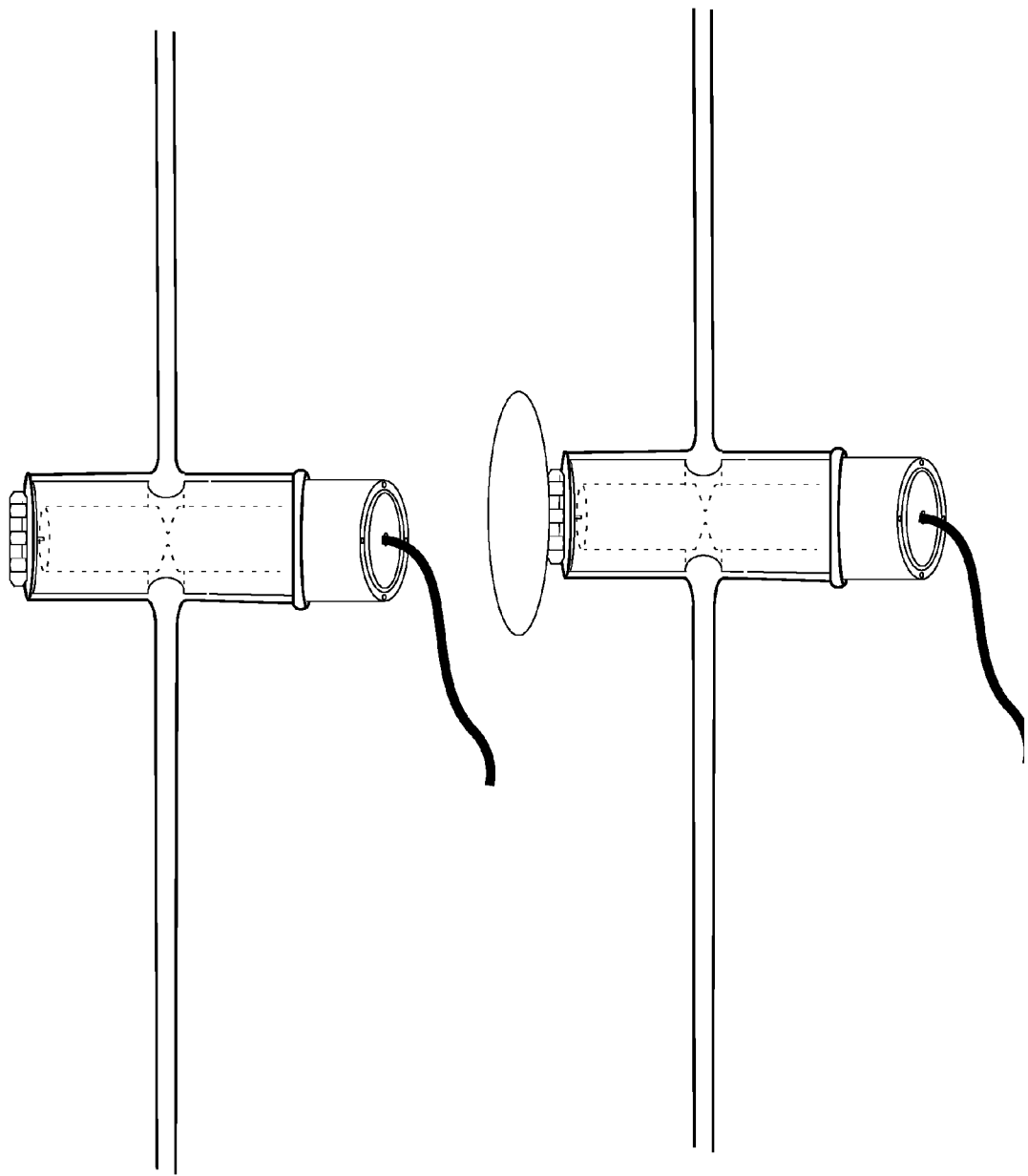
FIGS. 11a-11b depict a traditional laboratory glassware stopcock arrangement outfitted with servo or motor control arrangements.

FIG. 11*a* shows a traditional laboratory glassware stopcock arrangement outfitted with servo or motor control for the arrangement depicted in FIG. 7*g* or some of the longitudinally-movable gating element arrangements described above. Additionally, a handle can be subsequently attached to permit traditional hand-operation of the stopcock; one embodiment of this is depicted in FIG. 11*b*. Alternatively, the handle can be of a different style, for example such as that depicted in FIG. 10*b*.

Multi-Port Glassware Stopcock-Controlled Manifold Technologies

Although three-way valves and other arrangements are sometimes integrated into some laboratory glassware apparatus (such as distilling heads), and some stopcock valve manifolds exists involving narrow tubing for gas flows, overall there is no viable multiple-valve laboratory glassware manifold apparatus compatible with standardized ground glass (conical or ball) joint fixtures.

Also, although a driving motivation for creating such inventive multiple-valve laboratory glassware manifold apparatus compatible with standardized ground glass (conical or ball) joint fixtures is computer-controlled lab automation employing servos and motors as taught in co-pending U.S. patent application Ser. No. 12/899,551, these glassware devices can readily find many potential applications in the traditional hand-operated glassware laboratory. In those hand-operated environments the inventive multiple-valve laboratory glassware manifold apparatus can be fitted with standard stopcock plugs or the increased usable rotation angle plugs.

Figure 12:
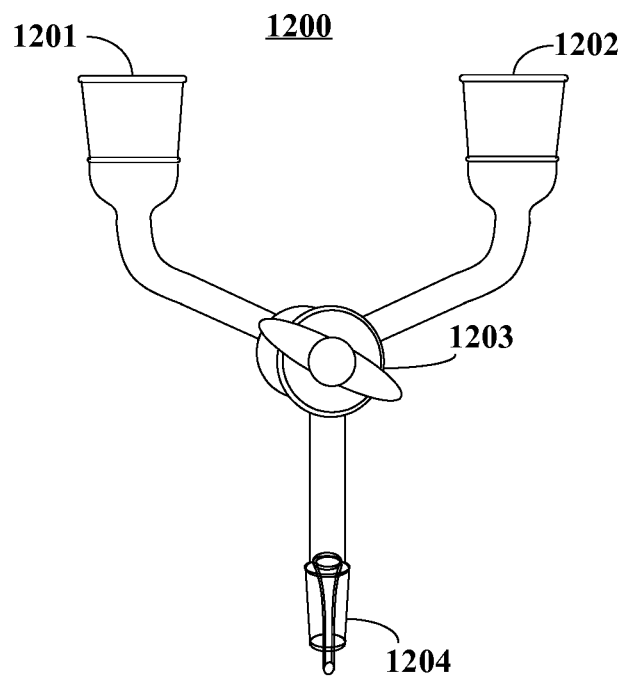
FIG. 12 depicts a two-port downward-merge valve manifold comprising a three-way hand-operated stopcock.

FIG. 12 shows an exemplary embodiment of a two-port downward-merge valve manifold comprising a three-way hand-operated stopcock 1203 and two ports 1201, 1202 at the top. Each port can be connected with a different external source or destination for chemical materials. These two ports 1201, 1202 are joined by a stopcock 1203. The plug within the stopcock 1203 can be turned thorough various angular positions that can be distinguished according to three function modes:

both ports 1201, 1202 are blocked;
flow occurs through port 1201 while port 1202 is blocked;
flow occurs through port 1202 while port 1201 is blocked.
The selected chemicals flow though the opposite port 1204. The passageway shape of the three-way stopcock plug can be traditional or can include the expanded usable rotation angle provisions discussed above and taught in co-pending U.S. patent application Ser. No. 12/899,551. In the figure, the ports are depicted as conically-tapered ground-glass joints, but other port connection arrangements such as spherical (ball/socket), Ace-Threds® (U.S. Pat. No. 3,695,642), flange, etc. The hand-operated stopcock can be additionally outfitted or instead replaced with servo or motor control. In a slightly modified embodiment provided for by the invention, the stopcock and plug in a component of glassware of FIG. 12 can be arranged so that can be turned thorough various angular positions that can be distinguished according to four function modes:

both ports 1201, 1202 are blocked; [0103]
flow occurs through port 1201 while through port 1202 is blocked;

flow occurs through port 1202 while through port 1201 is blocked;

flow occurs through both port 1201, 1202.

The fourth position allows for mixing or distribution. The selected, mixed, or distributed chemical materials can flow though the opposite port 1204. The passageway shape of the three-way stopcock plug can be traditional or can include the expanded usable rotation angle provisions. The hand-operated stopcock can be additionally outfitted or instead replaced with servo or motor control.

Figure 13:
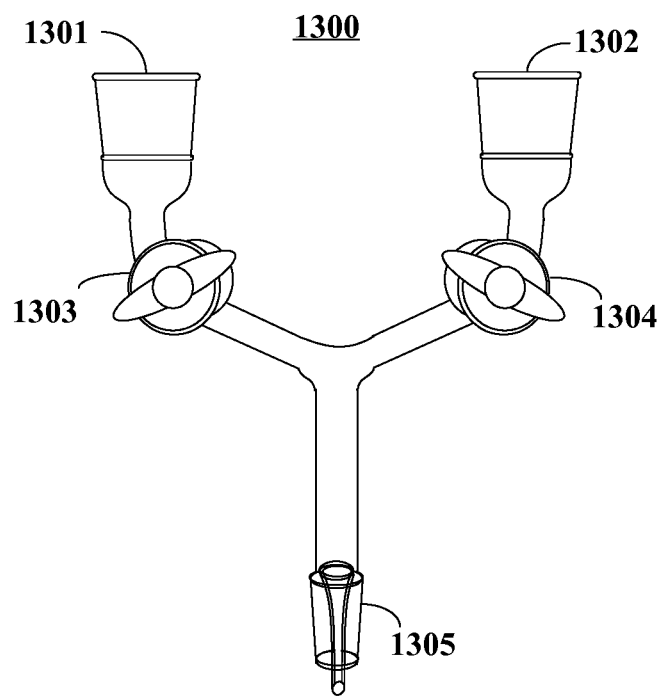
FIG. 13 shows another two-port downward-merge valve manifold similar to that in FIG. 12 but different in that each opening is provided with their own associated stopcock.

FIG. 13 shows a different exemplary embodiment of a two-port downward-merge valve manifold 1300 similar to that in FIG. 12 but different in that each opening (1301 and 1302) are provided with their own associated stopcock (1303 and 1304, respectively). Such an arrangement is useful for not only for having both ports on at the same time but also allowing independent adjustment. The stopcocks can be turned to two positions each for a total of four possible outcomes. The options are:

both port 1301, 1302 are blocked;
flow occurs through port 1301 while port 1302 is blocked;
flow occurs through port 1302 while port 1301 is blocked;
flow occurs through both ports 1301, 1302.

The selected, mixed, or distributed chemical materials can flow through common opposite port 1305. In the figure, the ports are depicted as conically-tapered ground-glass joints, but other port connection arrangements such as spherical (ball/socket), Ace-Threds® (U.S. Pat. No. 3,695,642), flange, etc. One or both of the hand-operated stopcocks can be additionally outfitted or instead replaced with servo or motor control.

Figure 14:
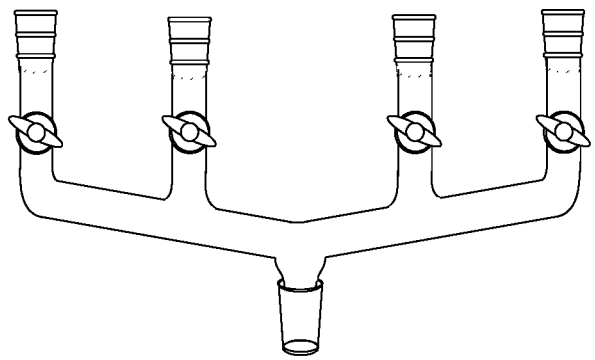
FIG. 14 shows a four-port downward-merge valve manifold comprising four hand-operated stopcocks.

FIG. 14 shows a four-port downward-merge valve manifold comprising four hand-operated stopcocks. One or more of the hand-operated stopcocks can be additionally outfitted or instead replaced with servo or motor control. In the figure, the ports are depicted as conically-tapered ground-glass joints, but other port connection arrangements such as spherical (ball/socket), Ace-Threds® (U.S. Pat. No. 3,695,642), flange, etc.

Figure 15:
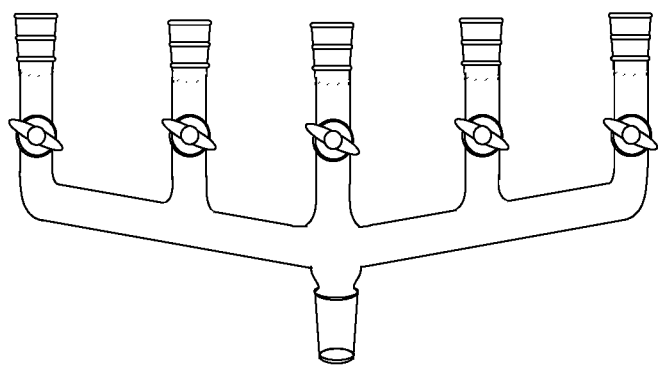
FIG. 15 shows a five-port downward-merge valve manifold comprising five hand-operated stopcocks.

FIG. 15 shows an exemplary five-port downward-merge valve manifold comprising five hand-operated stopcocks. One or more of the hand-operated stopcocks can be additionally outfitted or instead replaced with servo or motor control. In the figure, the ports are depicted as conically-tapered ground-glass joints, but other port connection arrangements such as spherical (ball/socket), Ace-Threds® (U.S. Pat. No. 3,695,642), flange, etc.

Figure 16:
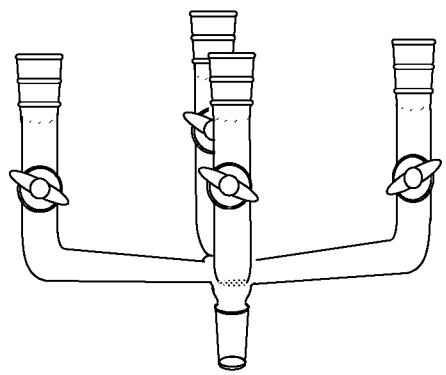
FIG. 16 shows an alternate four-port downward-merge valve manifold comprising four hand-operated stopcocks.

FIG. 16 shows an alternate exemplary four-port downward-merge valve manifold comprising four hand-operated stopcocks. The port distribution arrangement is one of an array rather than of a planar form. One or more of the hand-operated stopcocks can be additionally outfitted or instead replaced with servo or motor control. In the figure, the ports are depicted as conically-tapered ground-glass joints, but other port connection arrangements such as spherical (ball/socket), Ace-Threds® (U.S. Pat. No. 3,695,642), flange, etc.

Figure 17:
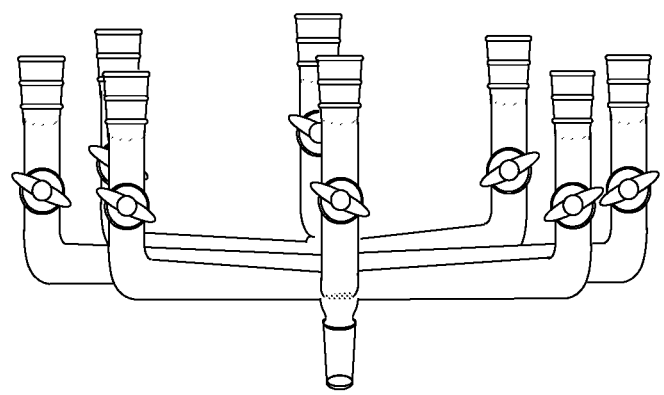
FIG. 17 shows an eight-port downward-merge valve manifold comprising eight hand-operated stopcocks.

FIG. 17 shows an exemplary eight-port downward-merge valve manifold comprising eight hand-operated stopcocks. The port distribution arrangement is one of an array rather than of a planar form. One or more of the hand-operated stopcocks can be additionally outfitted or instead replaced with servo or motor control. In the figure, the ports are depicted as conically-tapered ground-glass joints, but other port connection arrangements such as spherical (ball/socket), Ace-Threds® (U.S. Pat. No. 3,695,642), flange, etc.

Figure 18A:
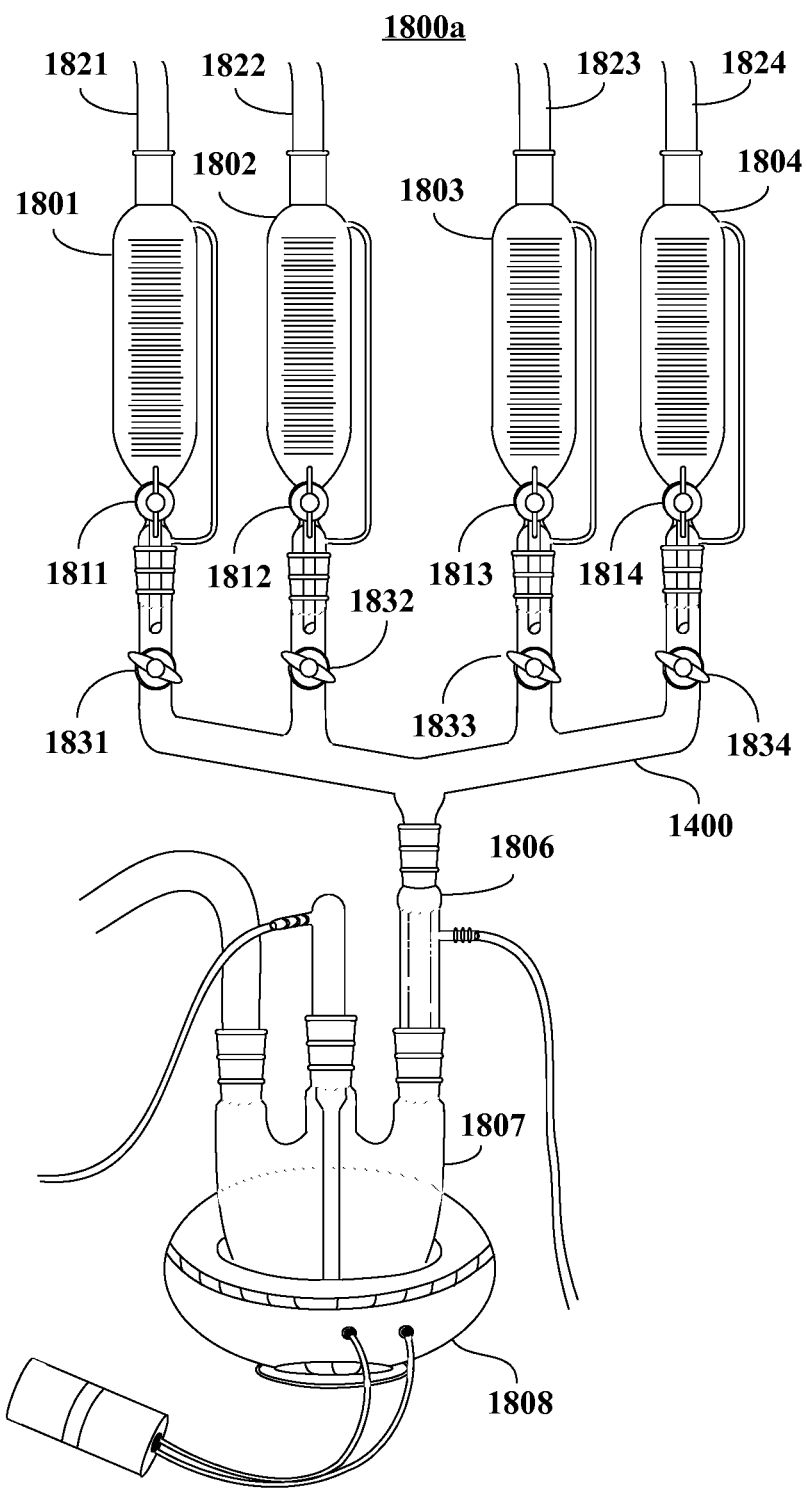
FIGS. 18a-18c depict an exemplary laboratory glassware configuration and adaptations to utilize motorized rotary valves so as to support laboratory automation.
Figure 18B:
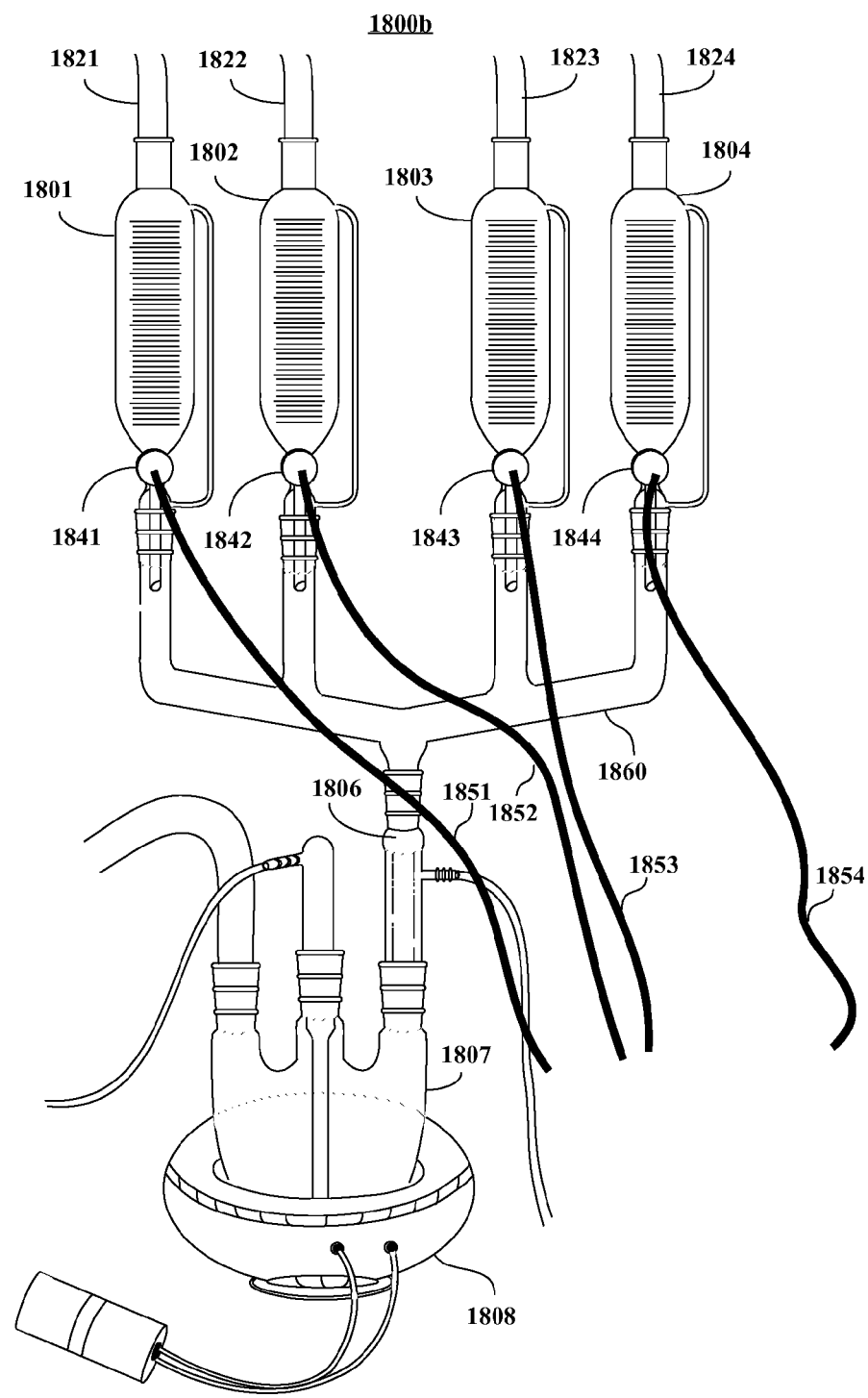
Figure 18C:
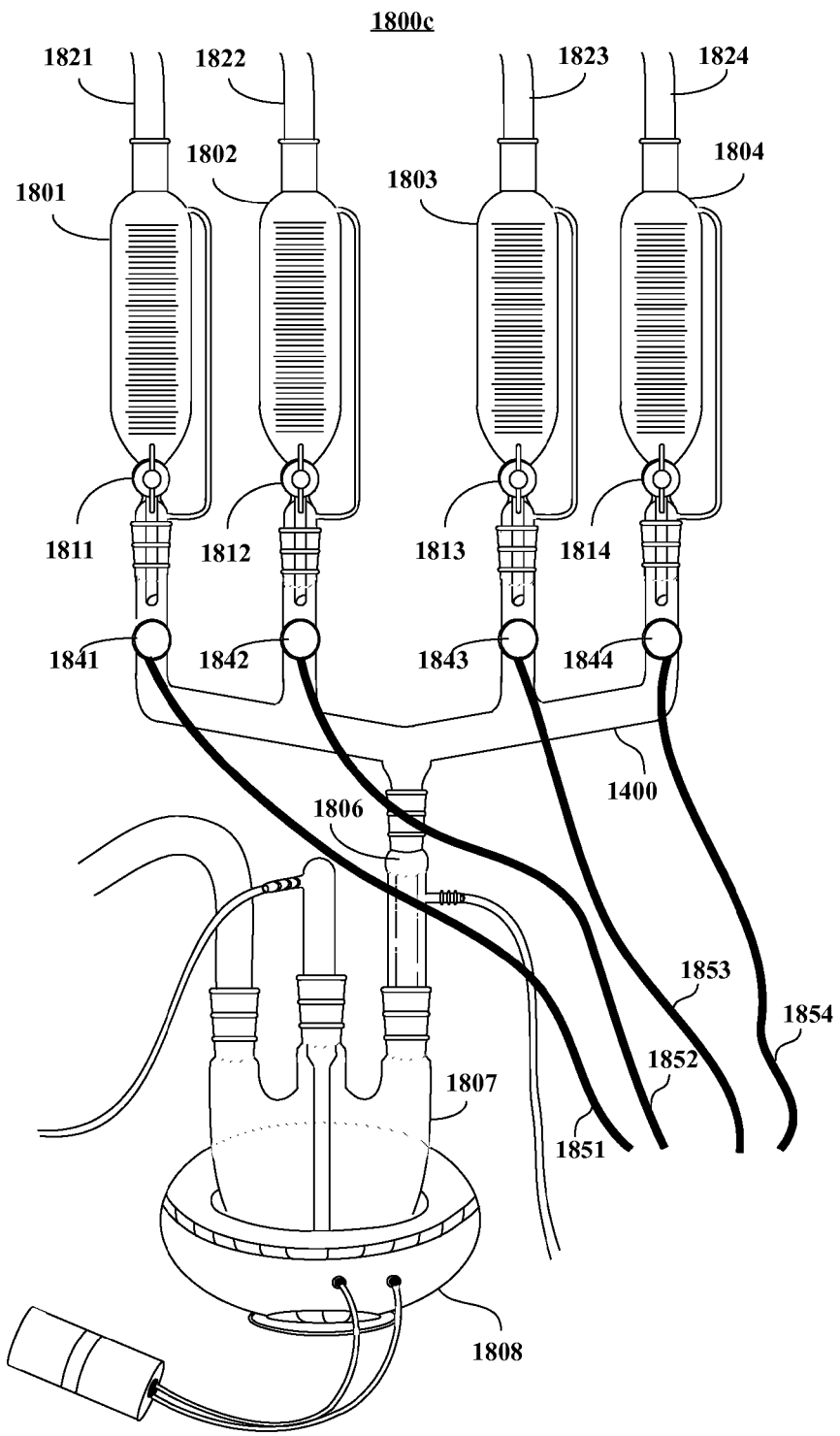

FIGS. 18a-18c depict an example laboratory glassware configuration and adaptations to utilize motorized rotary valves so as to support laboratory automation. FIG. 18a illustrates a laboratory glassware configuration 1800a utilizing an inventive four-port downward-merge valve manifold 1400, such as that depicted in FIG. 14, connecting via a vacuum adapter 1806 to a flask 1807 heated by a controlled electric heating mantel 1808. Here the four hand-operated stockcock rotary valves 1831-1834 are used to select alternate laboratory reagents and/or chemical species, in this case held in local small reservoirs within traditional pressure-equalizing addition funnels 1801-1804. Here the vacuum adapter 1806 can be used to provide (passive or active) pressure equalization, suction, venting, etc., so as to facilitate the transfer of chemical materials from one or more selected addition funnels 1801-1804, the selection made via the sequential or simultaneous operation of stockcock rotary valves 1831-1834. In this example set-up, which may be part of a considerably larger set-up, each of the addition funnels 1801-1804 are provided with incoming chemical materials, cleaning solvents, etc. via connecting tubes 1831-1834 each of which in turn are part of or connect with other apparatus. Note the addition funnels 1801-1804 each include their own internal stopcock 1811-1814—these are useful for holding materials when an addition funnel 1801-1804 is transported, or can be used for other purposes. Note that any one or more of the eight depicted stopcocks 1811-1814, 1831-1834 can be fitted with servo-controlled or motorized rotary valves as provided for by the invention.

FIG. 18b illustrates an application 1800b wherein four servo-controlled or motorized rotary valve adapters 1841-1844 are used to adapt the internal stopcock 1811-1814 in the traditional addition funnels 1801-1804. Such an arrangement is provided for by the invention and can be used in laboratory automation. Here the addition funnels 1801-1804 connect via a four-port downward-merge manifold arrangement 1860 that does not comprise stopcocks to a vacuum adapter 1806 in turn connecting to a flask 1807 heated by a controlled electric heating mantel 1808. Each of the servo-controlled or motorized rotary valve adapters 1841-1844 is used to replace the hand-operated stopcock 1811-1814 plug & handle components in the four the traditional addition funnels 1801-1804. Each of the servo-controlled or motorized rotary valve adapters 1841-1844 is connected to controlling equipment via associated small electrical cables 1851-1854.

FIG. 18c illustrates another application 1800c wherein four servo-controlled or motorized rotary valve adapters 1841-1844 are used to adapt the four-port downward-merge valve manifold arrangement 1825 in the set-up 1800a depicted in FIG. 18a. Such an arrangement is provided for by the invention and can be used in laboratory automation. Each of the servo-controlled or motorized rotary valve adapters 1841-1844 is used to replace the hand-operated stopcock plug & handle components in the four hand-operated stockcock rotary valves 1831-1834. Each of the servo-controlled or motorized rotary valve adapters 1841-1844 is connected to controlling equipment via associated small electrical cables 1851-1854.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. Therefore, the invention properly is to be construed with reference to the claims.

I claim:

1. An article of laboratory glassware for directing flow of chemical materials, the article comprising:
   a glass manifold having a plurality of input ports and at least one output port; and
   a plurality of stopcocks, each stopcock having an inlet port and an outlet port for carrying the flow of and controlling the flow of chemical materials, each stopcock further having a rotating plug, wherein each of the stopcock outlet ports is connected to one of the manifold input ports, and
      wherein each of the stopcock inlet ports is connected with one end of one of a plurality of hollow glass tubes, and
      wherein the other end of each of the plurality of hollow glass tubes is connected to a female ground glass joint,
      wherein each of the rotating plugs comprises a first elongated opening and a second elongated opening connected by a passageway through the rotating plug thereby connecting the inlet port and the outlet port of each stopcock, and further
      wherein the first and the second elongated openings define an area for carrying the flow of chemical materials, and wherein the area varies with the rotation of the rotating plug over an angle of rotation that exceeds an angle subtended by an arc length that is twice the width of the stopcock inlet port or twice the width of the stopcock outlet port,
      wherein each of the at least one output ports of the manifold is terminated to a male ground glass joint.

2. The article of laboratory glassware of claim 1 wherein the rotation of each rotating plug is driven by an electrical motor.

3. The article of laboratory glassware of claim 1 wherein the rotation of each rotating plug is driven by a servo.

4. The article of laboratory glassware of claim 1 wherein an angle of rotation of each rotating plug is sensed by a sensor.

5. The article of laboratory glassware of claim 1 wherein the rotation of each rotating plug is controlled by a computer.

6. The article of laboratory glassware of claim 1 wherein the first elongated and the second elongated openings are shaped to provide a specific cross-sectional area as a function of rotation of the associated rotating plug.

7. The article of laboratory glassware of claim 1 wherein at least one of the male ground glass joint and the female ground glass joint is a conically tapered ground glass joint.

8. The article of laboratory glassware of claim 1 wherein at least one ground glass joint is a spherical ground glass joint.

9. The article of claim 1, wherein the first opening has a teardrop shape.

10. The article of claim 9, wherein the second opening has a teardrop shape.

11. A laboratory stopcock for controlling the flow of liquids, the stopcock comprising:
    a stopcock body having an inlet port and an outlet port; and
    a rotatable plug disposed within the stopcock body,
       the rotatable plug comprising:
          a first elongated opening and a second elongated opening connected by a passageway through the rotatable plug thereby connecting the inlet port and the outlet port of the stopcock,
          wherein the first and the second elongated openings vary their cross-sectional areas with respect to the respective inlet and outlet ports when the rotatable plug is rotated, and
          wherein at least one of the first opening and the second opening has a teardrop shape.

12. The stopcock of claim 11 wherein the rotatable plug is rotated by an electrical motor.

13. The stopcock of claim 11 wherein the rotation of each rotatable plug is driven by a servo.

14. The stopcock of claim 11 wherein the amount of rotation of each rotatable plug is sensed by a sensor.

15. The stopcock of claim 11 wherein the rotation of each rotatable plug is controlled by a computer.

16. The stopcock of claim 11 wherein the first elongated and the second elongated openings are shaped to provide a specific cross-sectional area as a function of the rotation of the rotatable plug.

17. The stopcock of claim 11 wherein the stopcock body is fabricated from glass.

18. The stopcock of claim 11 wherein the stopcock rotatable plug is fabricated from glass.

19. The article of claim 11, wherein the first opening has a teardrop shape.

20. The article of claim 19, wherein the second opening has a teardrop shape.

* * * * *